(12) United States Patent
Sakai

(10) Patent No.: US 10,247,156 B2
(45) Date of Patent: Apr. 2, 2019

(54) INTERNAL COMBUSTION ENGINE

(71) Applicant: TOYOTA JIDOSHA KABUSHIKI KAISHA, Toyota-shi, Aichi-ken (JP)

(72) Inventor: Hiroyuki Sakai, Yokohama (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/882,203

(22) Filed: Jan. 29, 2018

(65) Prior Publication Data

US 2018/0216592 A1 Aug. 2, 2018

(30) Foreign Application Priority Data

Jan. 30, 2017 (JP) ................................ 2017-014624

(51) Int. Cl.
*F02M 43/00* (2006.01)
*F02M 61/16* (2006.01)
*F02M 67/12* (2006.01)
*F02B 31/00* (2006.01)

(52) U.S. Cl.
CPC .......... *F02M 61/162* (2013.01); *F02M 67/12* (2013.01); *F02M 2200/09* (2013.01); *F02M 2200/242* (2013.01); *F02M 2200/247* (2013.01); *F02M 2200/248* (2013.01); *Y02T 10/125* (2013.01); *Y02T 10/36* (2013.01)

(58) Field of Classification Search
CPC ...... F02D 41/402; F02D 41/403; F02D 41/40; F02B 23/0648; F02B 23/0651; F02B 2075/125

USPC ....... 123/301, 304, 305, 294, 295, 297, 298, 123/299
See application file for complete search history.

(56) References Cited

U.S. PATENT DOCUMENTS

| 5,170,759 A * | 12/1992 | Ito | F02D 41/008 123/276 |
| 5,211,145 A * | 5/1993 | Ichikawa | F02B 17/005 123/295 |
| 6,167,864 B1 * | 1/2001 | Nomura | F02B 17/005 123/298 |
| 6,341,487 B1 * | 1/2002 | Takahashi | F01N 3/0842 123/295 |

(Continued)

FOREIGN PATENT DOCUMENTS

| JP | 2004-150318 A | 5/2004 |
| JP | 2007-263065 A | 10/2007 |

(Continued)

*Primary Examiner* — John Kwon
(74) *Attorney, Agent, or Firm* — Sughrue Mion, PLLC

(57) ABSTRACT

An internal combustion engine comprises a fuel injector 31, a spark plug 16, a piston 14 having a cavity 91, a swirl control device 95, and a control system 70. The cavity is formed so as to change in distance from the fuel injector to a side wall surface of the cavity, in the circumferential direction. The system performs ignition assist control for successively performing injections of main fuel and ignition assist fuel, makes an air-fuel mixture formed by the ignition assist fuel burn by flame propagation by the spark plug, and makes the remaining fuel burn by pre-mix compression self-ignition. The system controls the swirl control device during the ignition assist control so that when the engine load is high, the fuel sprayed heads toward parts of the side wall surface which are short in distances from the fuel injector.

7 Claims, 13 Drawing Sheets

(56) References Cited

U.S. PATENT DOCUMENTS

| | | | | |
|---|---|---|---|---|
| 6,672,277 B2* | 1/2004 | Yasuoka | ............... | F02B 17/005 |
| | | | | 123/295 |
| 2003/0127068 A1* | 7/2003 | Hiraya | .................. | F02B 23/101 |
| | | | | 123/276 |
| 2003/0127069 A1* | 7/2003 | Hiraya | .................. | F02B 23/101 |
| | | | | 123/276 |
| 2012/0103302 A1* | 5/2012 | Attard | ..................... | F02B 19/12 |
| | | | | 123/260 |

FOREIGN PATENT DOCUMENTS

| JP | 2009-036126 A | 2/2009 |
|---|---|---|
| JP | 2012-072729 A | 4/2012 |
| JP | 2012-246859 A | 12/2012 |

\* cited by examiner

INTERNAL COMBUSTION ENGINE

TECHNICAL FIELD

The present invention relates to an internal combustion engine.

Background Art

Known in the art is an internal combustion engine designed to successively perform injection of main fuel and injection of ignition assist fuel from a fuel injector, make the air-fuel mixture formed by the injection of the ignition assist fuel burn by flame propagation by a spark plug, and utilize the heat or pressure rise caused by the combustion by flame propagation so as to make the remaining fuel burn by premixed compression self-ignition (for example, PLT 1).

CITATION LIST

Patent Literature

PLT 1: Japanese Patent Publication No. 2007-263065A
PLT 2: Japanese Patent Publication No. 2009-036126A
PLT 3: Japanese Patent Publication No. 2004-150318A
PLT 4: Japanese Patent Publication No. 2012-246859A

SUMMARY OF INVENTION

Technical Problem

In this regard, in the internal combustion engine explained above, when the engine load is low, self-ignition combustion does not easily occur. This is because the higher the pressure inside the combustion chamber, the more easily self-ignition combustion occurs, and when the engine load is low, the pressure of the intake gas fed into a combustion chamber is low. Therefore, when injecting and igniting fuel as explained above, the air-fuel mixture in the vicinity of a spark plug is burned by flame propagation, and then the air-fuel mixture positioned in a region far from the spark plug is successively burned by self-ignition from the inside toward the outside.

On the other hand, when the engine load is relatively high, the pressure of the intake gas fed into a combustion chamber is high, and therefore self-ignition combustion easily occurs. Therefore, when injecting and igniting fuel as explained above, after the air-fuel mixture in the vicinity of the spark plug burns by flame propagation, the air-fuel mixture present in the surroundings is burned by self-ignition all at once. If, in this way, the air-fuel mixture burns by self-ignition all at once, the combustion noise is higher.

Therefore, in view of the above problem, an object of the present invention is to provide an internal combustion engine performing an ignition assist operation using a spark plug so as to make part of an air-fuel mixture in a combustion chamber burn by self-ignition wherein combustion noise is suppressed even if the engine load is relatively high.

Solution to Problem

The present invention was made so as to solve the above problem and has as its gist the following.
(1) An internal combustion engine comprising: a fuel injector arranged at a top surface of a cylinder; a spark plug for igniting an air-fuel mixture in a combustion chamber; a piston having a cavity in its top surface; a swirl control device controlling a strength of a swirl flow formed in said combustion chamber; and a control system configured to control said fuel injector, said spark plug, and said swirl control device, wherein said fuel injector is arranged so as to be positioned in said cavity when viewed in an axial direction of said cylinder; said cavity is formed so as to change in distance from said fuel injector to a side wall surface of said cavity, in the circumferential direction; said control system is configured to be able to perform ignition assist control for successively performing injection of main fuel from said fuel injector and injection of ignition assist fuel, and controlling injection amounts and injection timings of said main fuel and said ignition assist fuel and an ignition timing of said spark plug so as to make an air-fuel mixture formed by injection of said ignition assist fuel burn by flame propagation by said spark plug and make the remaining fuel burn by pre-mix compression self-ignition using heat generated by said combustion by flame propagation; and said control system is configured to control said swirl control device during said ignition assist control so that when the engine load is relatively high, compared to when the engine load is relatively low, the fuel sprayed from said fuel injector heads toward parts of said side wall surface which are relatively short in distances from said fuel injector.
(2) The internal combustion engine according to above (1), wherein said cavity is formed so that inside projecting parts with relatively short distances from said fuel injector to the side wall surface and outside recessed parts with relatively long distances from said fuel injector to the side wall surface are alternately arranged in the circumferential direction, and at least two each of said inside projecting parts and said outside recessed parts are provided.
(3) The internal combustion engine according to above (2), wherein spray holes of said fuel injector are formed so that spray directions from the spray holes are directions toward said outside recessed parts, said control system is configured to control said swirl control device so that when an engine load is lower than a predetermined load, the swirl flow is relatively weak so as to suppress movement of fuel sprayed from said fuel injector in the circumferential direction, and said control system is configured to control said swirl control device so that when an engine load is said predetermined load or more, the swirl flow is relatively strong so as to promote movement of the fuel sprayed from said fuel injector in the circumferential direction.
(4) The internal combustion engine according to above (2), wherein spray holes of said fuel injector are formed so that the spray directions from the spray holes are directions toward said inside projecting parts, said control system is configured to control said swirl control device so that when an engine load is lower than a predetermined load, the swirl flow is relatively strong so as to promote movement of the fuel sprayed from said fuel injector in the circumferential direction, and said control system is configured to control said swirl control device so that when an engine load is said predetermined load or more, the swirl flow is relatively weak so as to suppress movement of the fuel sprayed from said fuel injector in the circumferential direction.
(5) The internal combustion engine according to any one of above (2) to (4), wherein said fuel injector has a number of spray holes equal to the number of said inside projecting parts of said cavity, and the spray holes of said fuel injector and said inside projecting parts are arranged at equal intervals in the circumferential direction of a cylinder.

Advantageous Effects of Invention

According to the present invention, in an internal combustion engine performing an ignition assist operation using a spark plug so as to make part of an air-fuel mixture in a combustion chamber burn by self-ignition, it is possible to suppress combustion noise even if the engine load is relatively high.

DESCRIPTION OF EMBODIMENT

Figure 1:
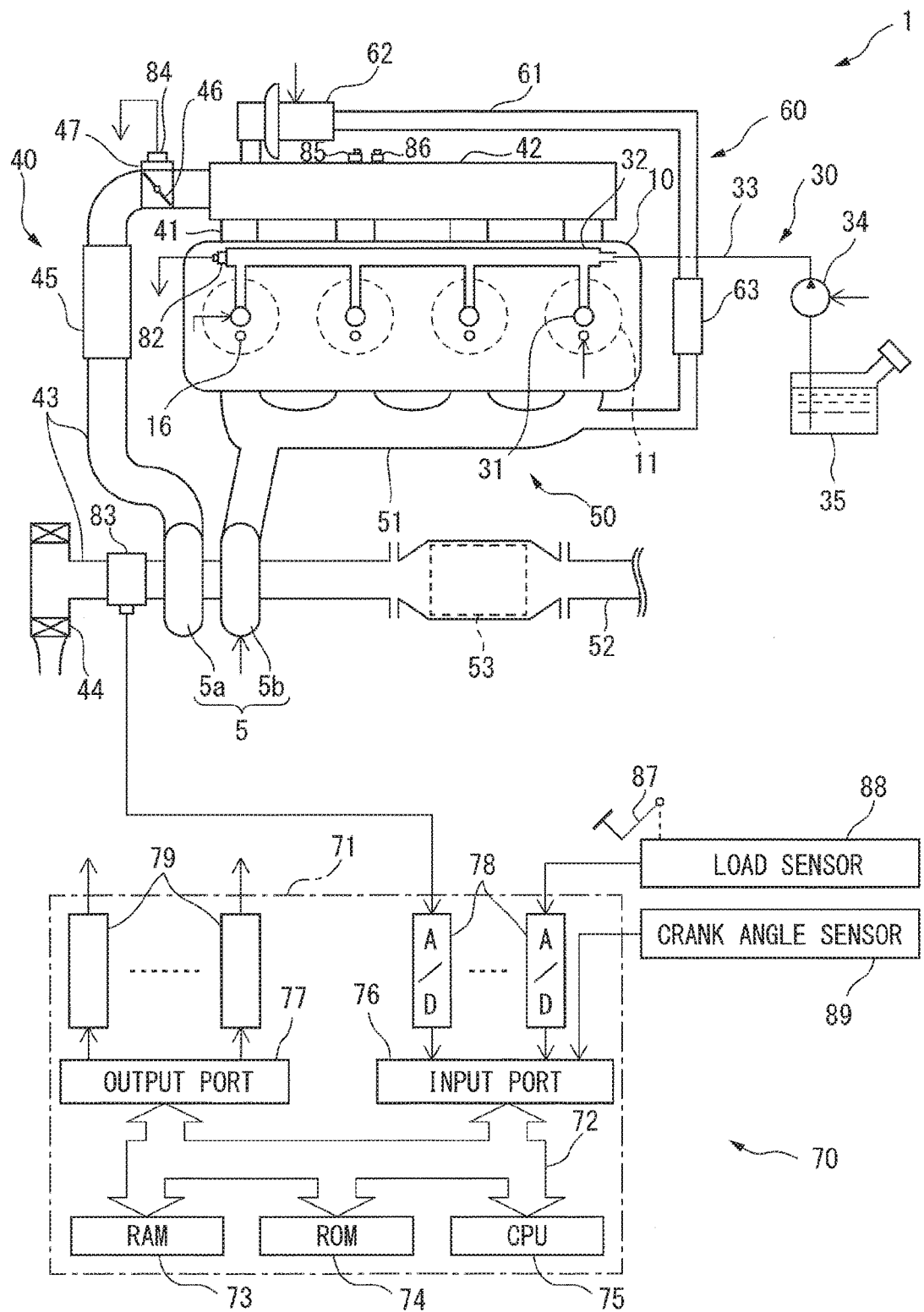
FIG. 1 is a schematic view of an overall internal combustion engine according to a first embodiment.

Below, referring to the drawings, embodiments of the present invention will be explained in detail. Note that, in the following explanation, similar components are assigned the same reference numerals.

<First Embodiment>
<<Explanation of Overall Internal Combustion Engine>>

Figure 2:
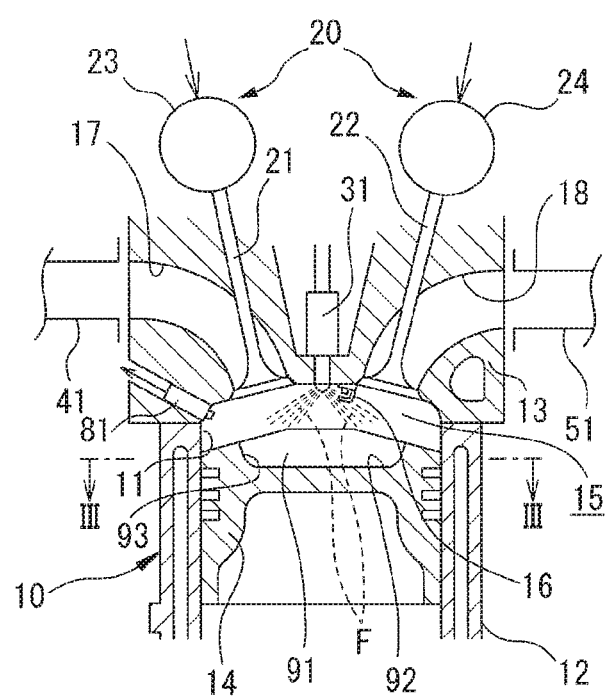
FIG. 2 is a cross-sectional view of an engine body.

First, referring to FIGS. 1 and 2, the configuration of an internal combustion engine 1 according to the first embodiment will be explained. FIG. 1 is a schematic view of the configuration of an internal combustion engine 1 fueled by gasoline. FIG. 2 is a schematic cross-sectional view of an engine body 10 of the internal combustion engine 1.

As shown in FIGS. 1 and 2, the internal combustion engine 1 comprises an engine body 10, variable valve operating mechanism 20, fuel feed system 30, intake system 40, exhaust system 50, EGR mechanism 60, and control system 70.

The engine body 10 comprises a cylinder block 12 in which a plurality of cylinders 11 are formed, and a cylinder head 13. In each cylinder 11, a piston 14 is arranged to reciprocate in the cylinder 11. In the cylinder 11 between the piston 14 and cylinder head 13, a combustion chamber 15 in which an air-fuel mixture is burned is formed. The cylinder head 13 comprises, near the center of each cylinder 11, a spark plug 16 for igniting the air-fuel mixture in the combustion chamber 15.

The cylinder head 13 is formed with intake ports 17 and exhaust ports 18. These intake ports 17 and exhaust ports 18 are communicated with the combustion chambers 15 of the cylinders 11. Between each combustion chamber 15 and intake port 17, an intake valve 21 is arranged. This intake valve 21 opens and closes the intake port 17. Similarly, between each combustion chamber 15 and exhaust port 18, an exhaust valve 22 is arranged. This exhaust valve 22 opens and closes the exhaust port 18.

The variable valve operating mechanism 20 comprises an intake variable valve operating mechanism 23 for driving the intake valve 21 of each cylinder to open and close, and an exhaust variable valve operating mechanism 24 for driving the exhaust valve 22 of each cylinder to open and close. The intake variable valve operating mechanism 23 can control the opening timing, closing timing, and lift amount of an intake valve 21. Similarly, the exhaust variable valve operating mechanism 24 can control the opening timing, closing timing, and lift amount of an exhaust valve 22. These variable valve operating mechanisms 23 and 24 are configured to change the opening timings, etc., by driving the intake valve 21 and exhaust valve 22 to open and close by electromagnetic actuators. Alternatively, these variable valve operating mechanisms 23 and 24 may be configured so as to change the opening timings, etc., by changing the relative phase of a camshaft with respect to a crankshaft or changing a cam profile by hydraulic pressure, etc.

The fuel feed system 30 comprises fuel injectors 31, a delivery pipe 32, fuel feed pipe 33, fuel pump 34, and fuel tank 35. Each fuel injector 31 is arranged in the cylinder head 13 so as to directly inject fuel into a combustion chamber 15 of each cylinder 11. In particular, in the present embodiment, each fuel injector 31 is arranged adjoining a spark plug 15 and near a center of a cylinder 11 so that an electrode part of the spark plug 16 is positioned in a fuel injection region F from the fuel injector 31 or its vicinity.

The fuel injectors 31 are connected through the delivery pipe 32 and fuel feed pipe 33 to the fuel tank 35. In the fuel feed pipe 33, a fuel pump 34 is arranged for pumping out fuel from inside the fuel tank 35. Fuel pumped out by the fuel pump 34 is supplied through the fuel feed pipe 33 to the delivery pipe 32 and directly injected from a fuel injector 31 into a combustion chamber 15 along with the fuel injector 31 being opened.

The intake system 40 comprises intake runners 41, a surge tank 42, intake pipe 43, air cleaner 44, compressor 5a of an exhaust turbocharger 5, intercooler 45, and throttle valve 46. The intake ports 17 of the cylinders 11 are communicated with the surge tank 42 through respectively corresponding intake runners 41. The surge tank 42 is communicated with the air cleaner 44 through the intake pipe 43. The intake pipe 43 is provided with the compressor 5a of the exhaust turbocharger 5 compressing and discharging intake air flowing through the inside of the intake pipe 43, and the intercooler 45 cooling the air compressed by the compressor 5a. The intercooler 45 is arranged at a downstream side of the compressor 5a in the direction of flow of intake air. The throttle valve 46 is arranged in the intake pipe 43 between the intercooler 45 and the surge tank 42. The throttle valve 46 can be turned by the throttle valve drive actuator 47 so as to change the opening area of the intake passage. Note that, an intake port 17, an intake runner 41, the surge tank 42, and the intake pipe 43 form an intake passage for supplying intake gas to a combustion chamber 15.

The exhaust system 50 comprises an exhaust manifold 51, exhaust pipe 52, turbine 5b of an exhaust turbocharger 5, and exhaust post-treatment device 53. The exhaust ports 18 of the cylinders 11 are communicated with the exhaust manifold 51. The exhaust manifold 51 is communicated with the exhaust pipe 52. The exhaust pipe 52 is provided with a turbine 5b of the exhaust turbocharger 5. The turbine 5b is driven to rotate by energy of the exhaust gas. The compressor 5a and turbine 5b of the exhaust turbocharger 5 are connected by a rotary shaft. If the turbine 5b is driven to rotate, along with this, the compressor 5a rotates and thereby the intake air is compressed. Further, the exhaust pipe 52 is provided with the exhaust post-treatment device 53 at a downstream side of the turbine 5b in the direction of flow of exhaust. The exhaust post-treatment device 53 is a device for cleaning the exhaust gas and then discharging it into the outer atmosphere, and comprises various types of exhaust purification catalysts for removing harmful substances or filters for trapping harmful substances, etc. Note that, an exhaust port 18, the exhaust manifold 51, and the exhaust pipe 52 form an exhaust passage discharging exhaust gas from a combustion chamber 15.

The EGR mechanism 60 comprises an EGR pipe 61, EGR control valve 62, and EGR cooler 63. The EGR pipe 61 is connected to the exhaust manifold 51 and surge tank 42, and connects them with each other. The EGR pipe 61 is provided with the EGR cooler 63 for cooling the EGR gas flowing through the inside of the EGR pipe 61. In addition, the EGR pipe 61 is provided with the EGR control valve 62 able to change the opening area of the EGR passage formed by the EGR pipe 61. By controlling the opening degree of the EGR control valve 62, the flow rate of EGR gas recirculated from the exhaust manifold 51 to the surge tank 42 is adjusted.

The control system 70 comprises an electronic control unit (ECU) 71 and various sensors. The ECU 71 is comprised of a digital computer comprising components connected with each other through a bidirectional bus 72, such as a RAM (random access memory) 73, ROM (read only memory) 74, CPU (microprocessor) 75, input port 76, and output port 77.

The cylinder head 13 is provided with a cylinder pressure sensor 81 for detecting a pressure in a cylinder 11 (cylinder pressure). Further, the delivery pipe 32 is provided with a fuel pressure sensor 82 for detecting a pressure of fuel in the delivery pipe 32, that is, the pressure of fuel injected from a fuel injector 31 to a cylinder 11 (injection pressure). The intake pipe 43 is provided with an air flow meter 83 for detecting a flow rate of air flowing through the inside of the intake pipe 43, at an upstream side of the compressor 5a of the exhaust turbocharger 5 in the direction of flow of intake. The throttle valve 46 is provided with a throttle opening degree sensor 84 for detecting its opening degree (throttle opening degree). In addition, the surge tank 42 is provided with an intake pressure sensor 85 for detecting the pressure of intake gas in the surge tank 42, that is, the pressure of intake gas sucked into the cylinder 11 (intake pressure). Furthermore, the surge tank 42 is provided with an intake temperature sensor 86 for detecting the temperature of the intake gas in the surge tank 42, that is, the temperature of the intake gas sucked into the cylinder 11 (intake temperature). The outputs of these cylinder pressure sensor 81, fuel pressure sensor 82, air flow meter 83, throttle opening degree sensor 84, intake pressure sensor 85, and intake temperature sensor 86 are input to the input port 76 through corresponding AD converters 78.

Further, the accelerator pedal 87 is connected to a load sensor 88 generating an output voltage proportional to an amount of depression of the accelerator pedal 87. The output voltage of the load sensor 88 is input to the input port 76 through a corresponding AD converter 78. Therefore, in the present embodiment, the amount of depression of the accelerator pedal 87 is used as the engine load. The crank angle sensor 89 generates an output pulse every time the crankshaft of the engine body 10 rotates, for example, by 15 degrees. This output pulse is input to the input port 76. In the CPU 75, the engine rotational speed is calculated from the output pulses of this crank angle sensor 89.

On the other hand, the output port 77 of the ECU 71 is connected to actuators controlling the operation of the internal combustion engine 1 through the corresponding drive circuits 79. In the example shown in FIGS. 1 and 2, the output port 77 is connected to the spark plugs 16, intake variable valve operating mechanism 23, exhaust variable valve operating mechanism 24, fuel injectors 31, fuel pump 34, throttle valve drive actuator 47, and EGR control valve 62. The ECU 71 outputs control signals for controlling these actuators from the output port 77 to control the operation of the internal combustion engine 1.

<<Structure of Piston>>

Figure 3:
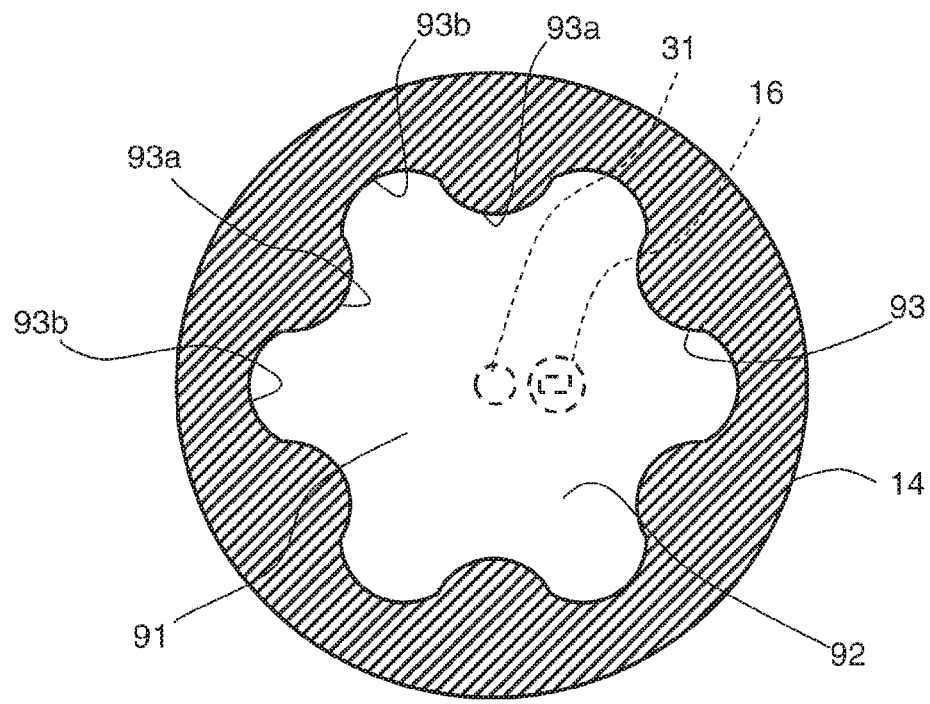
FIG. 3 is a cross-sectional view of a top part of a piston seen along a line III-III of FIG. 2.

FIG. 3 is a cross-sectional view of a top part of a piston seen along the line III-III of FIG. 2. As will be understood from FIGS. 2 and 3, the piston 14 has a cavity 91 formed at the top surface. As shown in FIG. 3, when viewed in the axial direction of the cylinder 11, the cavity 91 is formed so as to surround the fuel injector 31, in particular, in the present embodiment, so that the fuel injector 31 is positioned at the center. Conversely speaking, the fuel injector 31 is arranged, when viewed in the axial direction of the cylinder 11, so as to be positioned inside the cavity 91 in particular, in the present embodiment, so as to be positioned at the center of the cavity 91.

Further, the cavity 91 has a bottom surface 92 and a side wall surface 93. The bottom surface 92 extends in a direction generally perpendicular to the axis of the piston 14. On the other hand, the side wall surface 93 is connected with the circumference of the bottom surface 92 and defines the outer circumference of the cavity 91.

The side wall surface 93 of the cavity 91 is formed so as to form undulating shapes to the inside and outside in the circumferential direction centered about the fuel injector 31. In other words, the side wall surface 93 of the cavity 91 is formed so that parts of a relatively short distance from the fuel injector 31, defined as the "inside projecting parts 93a", and parts of a relatively long distance from the fuel injector 31, defined as the "outside recessed parts 93b", are alternately arranged in the circumferential direction. In particular, in the present embodiment, the inside projecting parts 93a and the outside recessed parts 93b are arranged at equal intervals in the circumferential direction of the cylinder, respectively.

In addition, in the example shown in FIG. 3, six inside projecting parts 93a and six outside recessed parts 93b are formed. Further, in the example shown in FIG. 3, the inside projecting parts 93a are formed so as to stick out in arc shapes toward the axis of the fuel injector 31, while the outside recessed parts 93b are formed so as to be recessed in arc shapes so as to be away from the axis of the fuel injector 31.

In addition, in the present embodiment, the inside projecting parts 93a and the outside recessed parts 93b are formed so as to be substantially the same shapes in the cross-section including the axis of the piston 14. In particular, in the present embodiment, the inside projecting parts 93a and the outside recessed parts 93b are both formed so as to have cross-sections extending slightly tilted with respect to the axis of the piston 14 as shown in FIG. 2.

Note that, in the example shown in FIG. 3, six inside projecting parts 93a and six outside recessed parts 93b are formed. However, the number of inside projecting parts 93a and outside recessed parts 93b may be seven or more, or five or less, respectively. However, the cavity 91 has to be formed to be provided with at least two inside projecting parts 93a and at least two outside recessed parts 93b.

Further, in the example shown in FIG. 3, the inside projecting parts 93a and the outside recessed parts 93b are respectively formed in arc shapes. However, the inside projecting parts 93a may be any shapes so long as they are shorter in distance to the fuel injector 31 compared with the outside recessed parts 93b. Further, the outside recessed parts 93b may be any shapes so long as they are longer in distance to the fuel injector 31 than the inside projecting parts 93a.

From the above, in the present embodiment, the cavity 91 can be said to be formed so that the distance from the fuel injector 31 to the side wall surface of the cavity 91 changes in the circumferential direction.

<<Explanation of Swirl Control Valve>>

Figure 4:
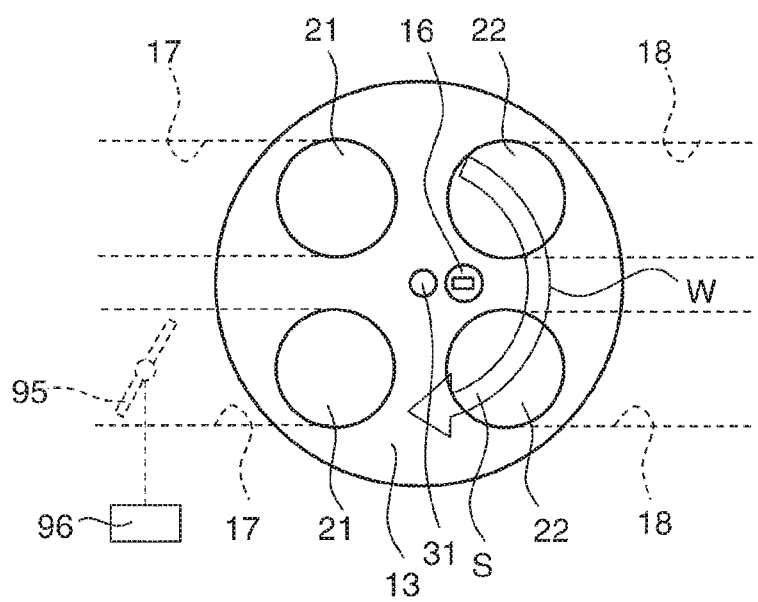
FIG. 4 is a bottom view of a top wall surface of a combustion chamber.

FIG. 4 is a bottom view of the top wall surface of a combustion chamber 15. As will be understood from FIG. 4, the engine body 10 comprises a swirl control valve 95 arranged in one of the two intake ports 17 communicated with a cylinder 11. The swirl control valve 95 is turned by a swirl control valve drive actuator 96 connected to the swirl control valve 95. Along with this, it is possible to change the opening area of the intake port 17 at which the swirl control valve 95 is arranged. The swirl control valve drive actuator 96 is connected to the output port 77. Note that, the swirl control valve 95 may also be provided in an intake runner 41 if it is possible to control the flow rate of only the intake gas flowing through one of the two intake ports 17.

If the thus configured swirl control valve 95 is closed, the intake gas flows into the combustion chamber 15 through only the intake port 17 in which the swirl control valve 95 is not provided. As a result, in the combustion chamber 15, a swirl flow such as shown by the arrow W in FIG. 4 is generated. On the other hand, if the swirl control valve 95 is fully opened, the intake gas flow into the combustion chamber 15 through both intake ports 17. As a result, almost no swirl flow W is generated in the combustion chamber 15. This swirl flow W changes according to the opening degree of the swirl control valve 95. In particular, the smaller the opening degree of the swirl control valve 95, the stronger the swirl flow W. Therefore, the swirl control valve 95 can control the strength of the swirl flow generated in the combustion chamber 15.

Note that, in the present embodiment, a swirl control valve 95 is used as the swirl control device controlling the strength of the swirl flow generated in a combustion chamber 15. However, if possible to control the strength of the swirl flow, a swirl control device other than the swirl control valve 95 may also be used.

<<Basic Combustion Control>>

Figure 5:
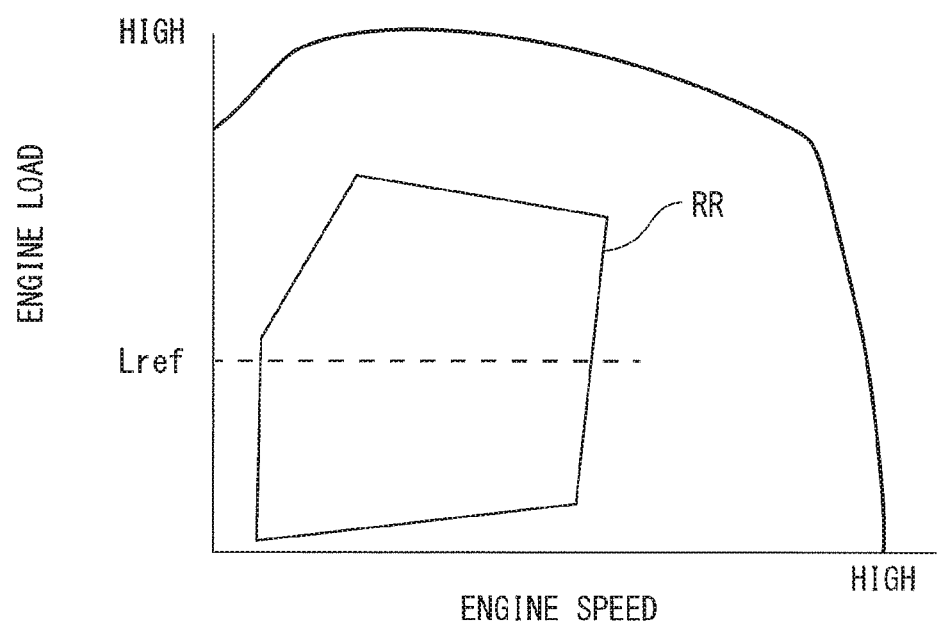
FIG. 5 is a view showing operating regions in which operations under different operating modes are performed.

Next, referring to FIGS. 5 to 7, the basic combustion control according to the control system 70 of the present embodiment will be explained. In the present embodiment, the control system 70 operates the internal combustion engine by the two modes of a spark ignition operating mode (below, referred to as the "SI operating mode") and a compression self-ignition operating mode (below, referred to as the "CI operating mode").

In the SI operating mode, the control system 70 basically forms a pre-mix of the stoichiometric air-fuel ratio or near the stoichiometric air-fuel ratio, in a combustion chamber 15, and ignites this pre-mix by a spark plug 16. Due to this, the pre-mix burns in the combustion chamber 15 by flame propagation.

Further, in the CI operating mode, the control system 70 basically forms a pre-mix of a leaner air-fuel ratio than the stoichiometric air-fuel ratio (for example, 30 to 40 or so) in a combustion chamber 15 and makes this pre-mix burn by compression self-ignition. In particular, in the present embodiment, as the pre-mix, a stratified layer pre-mix having a burnable layer at the center part of the combustion chamber 15 and having an air layer around the inner wall surface of the cylinder 11, is formed.

Pre-mixed compression self-ignition combustion can be performed even if making the air-fuel ratio leaner than flame propagation combustion. Further, it can be performed even if making the compression ratio higher. For this reason, pre-mixed compression self-ignition combustion enables the fuel economy to be improved and enables the thermal efficiency to be improved. Further, in pre-mixed compression self-ignition combustion, the combustion temperature is lower than flame propagation combustion, and therefore the generation of $NO_x$ can be suppressed. Further, there is sufficient oxygen around the fuel, and therefore formation of unburned HC can also be suppressed.

Further, in pre-mixed compression self-ignition combustion, a reaction time is necessary until the air-fuel mixture self-ignites in a combustion chamber 15. If the engine rotational speed is high, the reaction time required for the air-fuel mixture to self-ignite can no longer be secured. For this reason, in the region of a high engine rotational speed, the operation is performed in the SI operating mode. Further, if the engine load is high and the torque generated by the internal combustion engine is large, excessively early ignition will occur, knocking will be caused, and good self-ignition combustion will no longer be possible. For this reason, in the high engine load region, the operation is also performed in the SI operating mode. As a result, in the present embodiment, if the state of the engine load as grasped by the engine load and the engine rotational speed is within the self-ignition region RR surrounded by the solid line in FIG. 5, the internal combustion engine is operated by the CI operating mode, while if in a region outside the self-ignition region RR, the internal combustion engine is operated in the SI operating mode.

Next, referring to FIGS. 6A, 6B and 7, the control of the variable valve operating mechanism 20, spark plugs 16, and fuel injectors 31 in the CI operating mode of the present embodiment will be explained.

To perform pre-mixed compression self-ignition combustion, the cylinder temperature must be risen to a temperature enabling self-ignition of the pre-mix. It is necessary to make the cylinder temperature higher than a temperature when, like in the SI operating mode, burning all of the pre-mix in a combustion chamber 15 by flame propagation. For this reason, in the present embodiment, for example, as shown in FIGS. 6A and 6B, in the CI operating mode, if necessary, the exhaust variable valve operating mechanism 24 is controlled so that the exhaust valve 22 opens not only in the exhaust stroke but also in the intake stroke. By opening the exhaust valve 22 again during the intake stroke, that is, performing a double exhaust valve opening operation, the high temperature exhaust gas exhausted from a cylinder during the exhaust stroke can be sucked back into the cylinder in the immediately following intake stroke. Due to this, the cylinder temperature is risen and the cylinder temperature of the cylinder 11 is maintained at a temperature enabling pre-mixed compression self-ignition combustion.

Figure 6A:
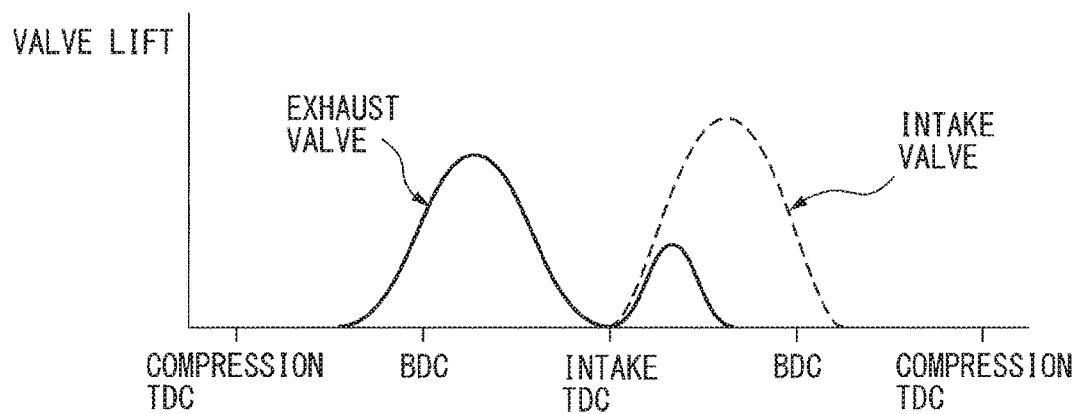
FIG. 6A is a view showing trends in amounts of lift of an intake valve and exhaust valve.
Figure 6B:
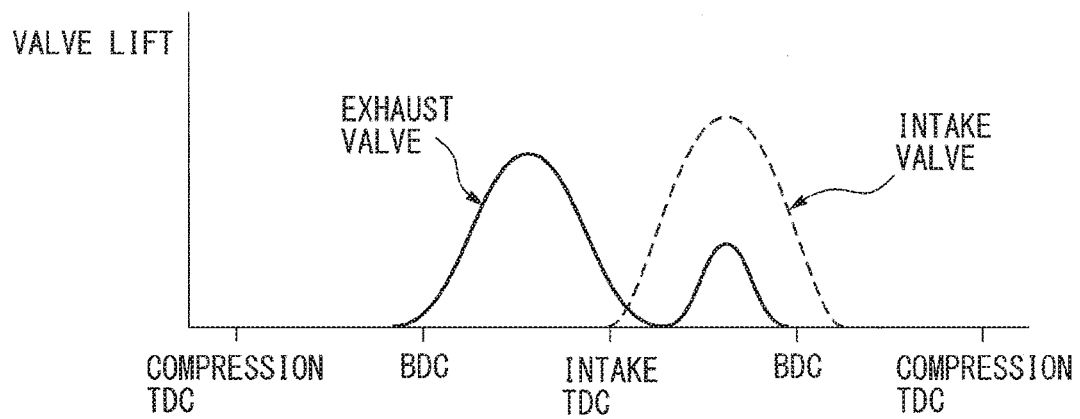
FIG. 6B is a view showing trends in amounts of lift of an intake valve and exhaust valve.

As shown in FIG. 6A, when a lift amount of the intake valve 21 is small, if opening the exhaust valve 22, a large amount of exhaust gas can be sucked back into the same cylinder, and therefore the cylinder temperature can be greatly risen. On the other hand, as shown in FIG. 6B, if opening the exhaust valve 22 after the lift amount of the intake valve 21 has become larger by a certain extent, the exhaust gas will be sucked back after air (fresh air) is sucked into the cylinder to a certain extent, and therefore the amount of exhaust gas which is sucked back into the same cylinder can be kept down and the rise in cylinder temperature can be suppressed. In this way, it is possible to control the amount of rise of the cylinder temperature in accordance with the timing of performing the double exhaust valve opening operation.

In addition, in the present embodiment, even in the CI operating mode, a spark plug 16 is used to ignite the air-fuel mixture. More specifically, in making the pre-mix burn by compression self-ignition in the combustion chamber 15, the system performs ignition assist control in which it performs an ignition assist operation by a spark plug 16 to make part of the fuel burn by flame propagation, then uses the heat generated by this flame propagation combustion to forcibly make the cylinder temperature rise and thereby make the remaining fuel burn by pre-mixed compression self-ignition combustion. By performing such an ignition assist operation to make the pre-mix burn by compression self-ignition, it becomes easy to control the self-ignition timing of the pre-mix to any timing.

Figure 7:
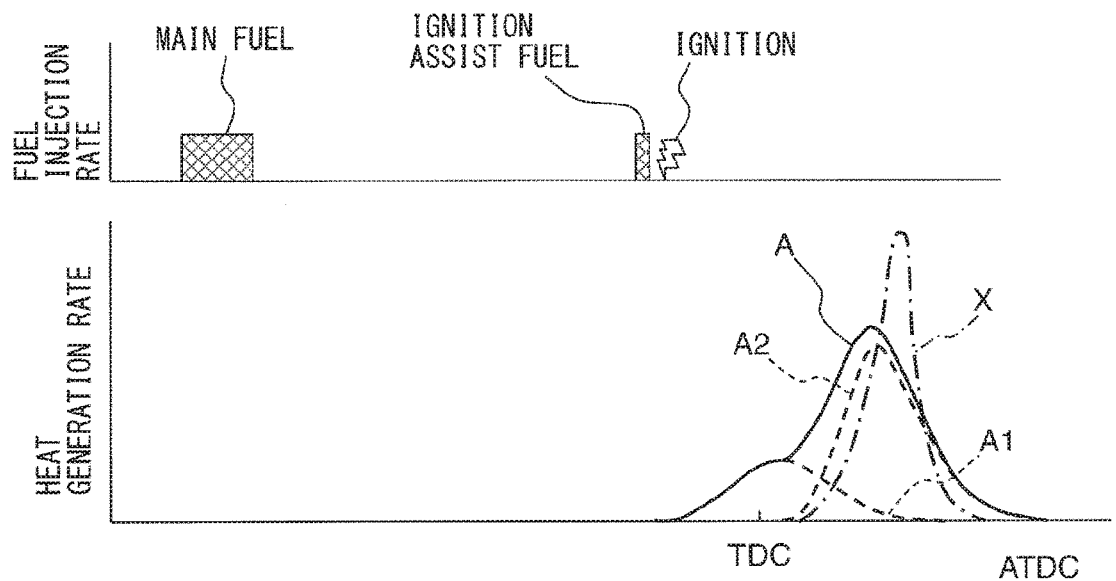
FIG. 7 is a view showing trends by crank angle of a fuel injection rate, ignition timing, and heat generation rate in the case of performing an ignition assist operation to make a pre-mix burn by compression self-ignition.

FIG. 7 is a view showing a relationship between a crank angle and a fuel injection rate, ignition timing, and heat generation rate, in the case of performing an ignition assist operation to cause a pre-mix to burn by compression self-ignition. The heat generation rate (dQ/dθ) [J/deg·CA] means the amount of heat per unit crank angle generated due to combustion of the air-fuel mixture, that is, the amount Q of heat generated per unit crank angle. The solid line in the figure (heat generation rate pattern A) shows the trends in the heat generation rate when making the pre-mix burn by compression self-ignition with performing an ignition assist operation, while the one-dot chain line in the figure (heat generation rate pattern X) shows the trends in the heat generation rate when making the pre-mix burn by compression self-ignition without performing ignition assist.

As shown in FIG. 7, when making the pre-mix burn by compression self-ignition along with an ignition assist operation, injection of main fuel by the fuel injector 31, injection of ignition assist fuel by the fuel injector 31, and ignition by the spark plug 16 are successively performed.

The main fuel is injected at any timing from the intake stroke to the compression stroke (in the example of FIG. 7, −50[deg·ATDC] or so). The injection amount of the main fuel is preferably half or more of the total fuel injection in each cycle. Due to the injection of the main fuel, a pre-mix is formed in the combustion chamber 15. Note that, in the example shown in FIG. 7, the mode is shown of injecting the main fuel during the compression stroke only one time, but it is also possible to inject the main fuel several times.

The ignition assist fuel is injected at any timing in the second half of the compression stroke after injecting the main fuel (in the example of FIG. 7, about −10[deg·ATDC]). Due to injection of the ignition assist fuel, around the spark plug 16, a rich air-fuel mixture is formed with an air-fuel ratio richer than the pre-mix formed in the combustion chamber 15 by the injection of main fuel.

Ignition by the spark plug 16 is performed at any timing in the second half of the compression stroke after injecting the ignition assist fuel (in the example of FIG. 7, about −8[deg·ATDC]). Due to this, the rich air-fuel mixture (ignition assist fuel) formed around the spark plug 16 is ignited and mainly this rich air-fuel mixture is burned by flame propagation. Due to this burning of the rich air-fuel mixture by flame propagation, heat is generated such as shown by a heat generation rate pattern A1 in FIG. 7. The thus generated heat makes the cylinder temperature forcibly rise. Due to this, the pre-mix (main fuel) is self-ignited by compression. Due to this burning of the pre-mix by compression self-ignition, heat is generated such as shown by a heat generation rate pattern A2 in FIG. 7. As a result, in a combustion chamber 15 in which combustion by flame propagation and combustion by compression self-ignition occur, the heat generation rate changes as shown by the heat generation rate pattern A.

From the above, in the present embodiment, the control system 70 can be said to be able to perform ignition assist control in which it successively injects main fuel and injects ignition assist fuel from the fuel injector 31 and in which it controls the injection amounts and injection timings of the main fuel and ignition assist fuel and the ignition timings so as to make the air-fuel mixture formed by the injection of ignition assist fuel burn by flame propagation by the spark plug 16 and use the heat generated by the flame propagation combustion to make the remaining fuel burn by pre-mixed compression self-ignition.

By performing ignition assist to make the pre-mix burn by compression self-ignition in this way, it becomes possible to easily control the ignition timing of the pre-mix to any timing. Further, since part of the fuel is burned by flame propagation, the amount of fuel consumed by burning by compression self-ignition becomes smaller. For this reason, it is possible to reduce the combustion noise compared with when all of the fuel is burned by pre-mixed compression self-ignition. The reason why it is possible to reduce the combustion noise in this way will be explained below.

When making the pre-mix burn by compression self-ignition, the fuel dispersed in the combustion chamber 15 self-ignites at multiple points at the same timing, and therefore the combustion speed is faster and the combustion duration is shorter compared with making it burn by flame propagation. For this reason, as shown by the heat generation rate pattern X shown by the one-dot chain line in FIG.

7, when making the pre-mix burn by compression self-ignition, the peak value of the heat generation rate and the maximum rise speed of the heat generation rate (that is, the slope of the heat generation pattern at the time of rise of the heat generation rate ($d^2Q/(d\theta)^2$)) tend to be relatively large.

Combustion noise is respectively correlated with a peak value of the heat generation rate and a maximum rise speed of the heat generation rate. The larger the peak value of the heat generation rate or the larger the maximum rise speed of the heat generation rate, the greater the combustion noise. For this reason, when making the pre-mix burn by compression self-ignition, the combustion noise is higher than when making the pre-mix burn by flame propagation.

As opposed to this, when performing an ignition assist operation to make the pre-mix burn by compression self-ignition, as shown by the heat generation rate pattern A shown by the solid line in FIG. 7, the peak value of the heat generation rate and the maximum rise speed of the heat generation rate ($d^2Q/(d\theta)^2$) respectively are smaller compared with the heat generation rate pattern B. For this reason, when performing an ignition assist operation to make the pre-mix burn by compression self-ignition, the combustion noise can be reduced.

<<Relationship Between Load and Combustion>>

Figure 8:
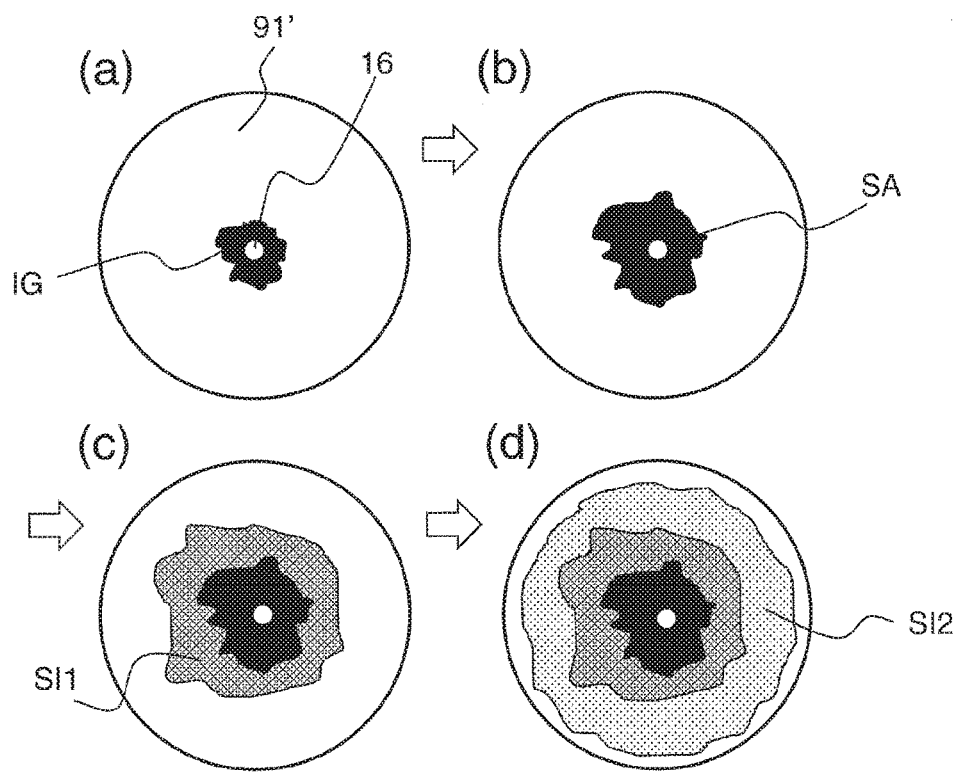
FIG. 8 is a view showing trends in combustion in a cavity when an engine load is relatively low.
Figure 9:
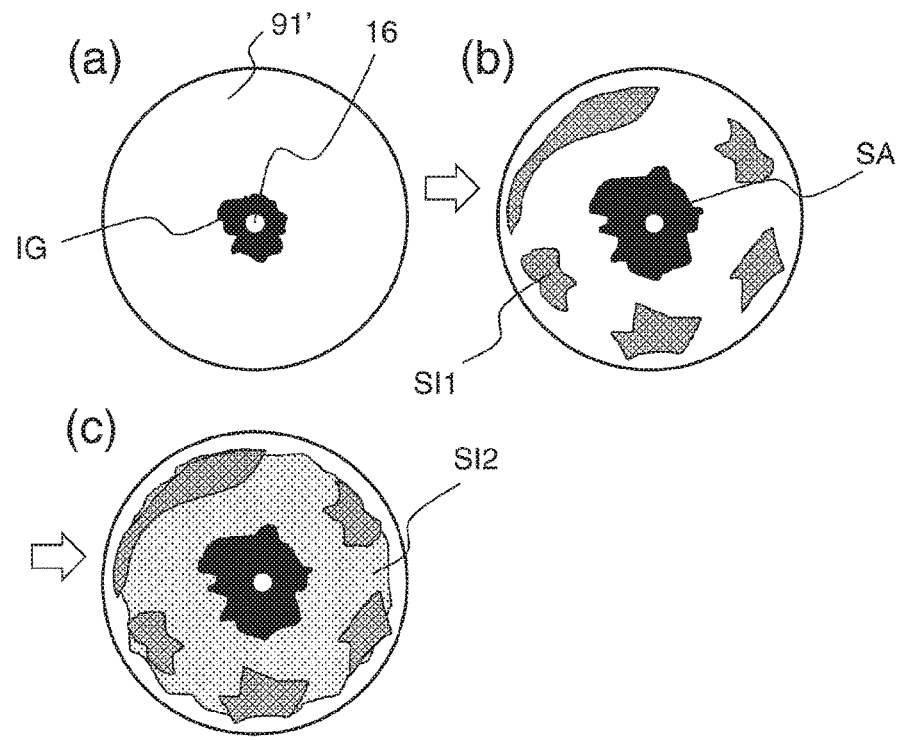
FIG. 9 is a view showing trends in combustion in a cavity when an engine load is relatively high.
Figure 10:
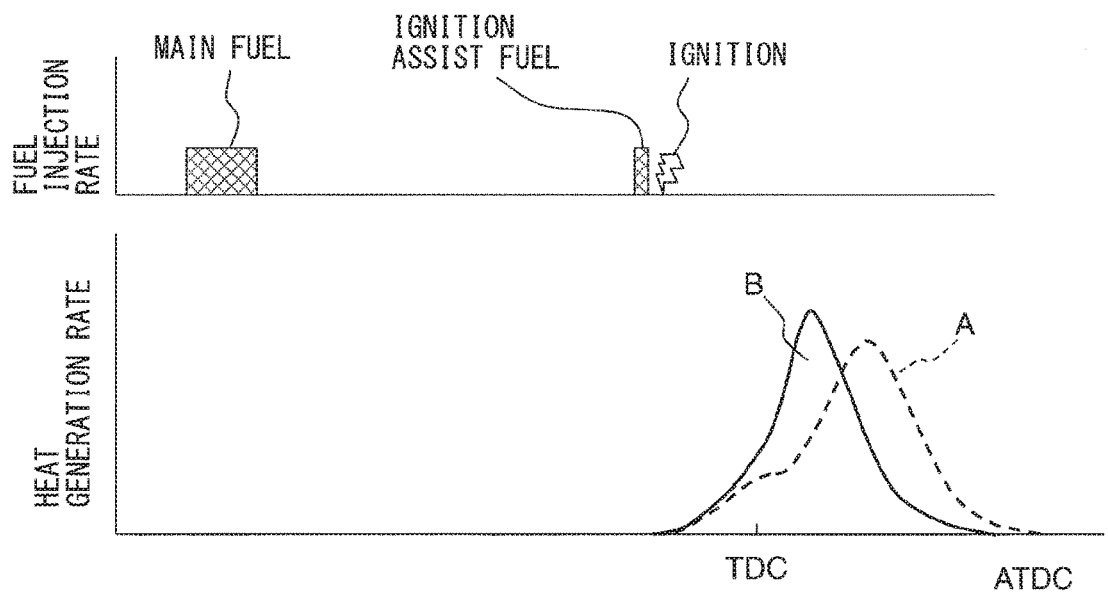
FIG. 10 is a view showing trends, by crank angle, of a fuel injection rate, ignition timing, and heat generation rate, depending on engine load.

Next, referring to FIGS. 8 to 10, the relationship between the engine load and the state of combustion in the CI operating mode will be explained. FIGS. 8 to 10 show the case, different from the present embodiment, in which the cavity 91' formed at the piston 14 does not have parts undulating to the inside and outside in the circumferential direction and accordingly is formed as a circle when viewed in the axial direction of the cylinder 11.

First, referring to FIG. 8, the time when the engine load is relatively low will be explained. In the region where the engine load is relatively low in the self-ignition region RR explained referring to FIG. 5, the pressure of the intake gas supplied to a combustion chamber 15 is relatively low. This is because the opening degree of the throttle valve 46 is small and the supercharging pressure by the exhaust turbocharger 5 is kept relatively low. If the pressure of the intake gas supplied to the combustion chamber 15 is low, the pressure of the intake gas in the combustion chamber 15 also is relatively low.

In this regard, the ease of self-ignition in pre-mixed compression self-ignition combustion changes in accordance with the temperature and pressure of the air-fuel mixture in the combustion chamber 15 and the local equivalent ratio of the air-fuel mixture (concentration of fuel in air-fuel mixture). As the temperature in the combustion chamber 15 is higher, as the pressure of the combustion chamber 15 is higher, and as the equivalent ratio of the air-fuel mixture is higher, self-ignition is easier.

As explained above, when the engine load is relatively low, the pressure of the intake gas in a combustion chamber 15 is relatively low. For this reason, the pre-mix formed in the combustion chamber 15 is relatively hard to self-ignite. Under such circumstances, in the combustion chamber 15, self-ignition combustion occurs in stages.

FIG. 8 is a view showing the change in combustion in the cavity 91' when the engine load is relatively low. When performing an ignition assist operation to make the pre-mix burn by compression self-ignition in the cavity 91', first, as shown in FIG. 7, main fuel is injected and ignition assist fuel is injected. In addition, right after injection of the ignition assist fuel, as shown in FIG. 8, ignition IG is performed by the spark plug 16 (FIG. 8(a)).

If ignition is performed by the spark plug 16, the pre-mix which had been formed around the spark plug 16 due to injection of the ignition assist fuel, burns by flame propagation SA (FIG. 8(b)). The ignition assist fuel is injected right before ignition by the spark plug 16, and therefore the ignition assist fuel is dispersed only in a narrow range around the spark plug 16, and thus flame propagation combustion SA also occurs only in the narrow range around the spark plug 16.

If flame propagation combustion SA causes the temperature and pressure of the air-fuel mixture in the cavity 91' to rise, due to this, self-ignition combustion SI1 of the pre-mix in the cavity 91' is started. In this regard, in the example shown in FIG. 8, the engine load is relatively low and accordingly the inside of the cavity 91' is an atmosphere where self-ignition is hard, and therefore self-ignition does not occur simultaneously in the entire region inside the cavity 91'. Instead, self-ignition occurs first at part of the region in the cavity 91'. In particular, in the region close to the center and relatively near the spark plug 16, flame propagation combustion occurs near the center of the cavity 91', and therefore the temperature is high and accordingly self-ignition combustion easily occurs. For this reason, the self-ignition combustion SI1 of the pre-mix occurs only in a region relatively close to the spark plug 16 (FIG. 8(c)).

After that, due to the rise in temperature or pressure in the cavity 91' accompanying the self-ignition combustion in the region near the center, the remaining regions in the cavity 91' also become an atmosphere where self-ignition easily occurs. Therefore, as shown by SI2, gradually the pre-mix burns by self-ignition (FIG. 8(d)).

FIG. 10 is a view showing trends, by crank angle, in the fuel injection rate, ignition timing, and heat generation rate, depending on the engine load. The broken line A in FIG. 10 shows the trend in the heat generation rate when the engine load is relatively low, while the solid line B in FIG. 10 shows the trend in the heat generation rate when the engine load is relatively high.

As explained above, when the engine load is relatively low, first, flame propagation combustion SA occurs. For this reason, as shown by the heat generation rate pattern A, the heat generation rate rises relatively slowly in the initial period of rise. Further, when the engine load is relatively low, in the cavity 91', self-ignition combustion does not occur simultaneously throughout the inside of the cavity 91', but occurs in stages. For this reason, as shown by the heat generation rate pattern A, the heat generation rate does not rapidly rise and, accordingly, the peak value of the heat generation rate and the maximum rise speed of the heat generation rate are relatively small. Therefore, when the engine load is relatively low, the combustion noise is kept low.

Next, referring to FIG. 9, the time when the engine load is relatively high will be explained. In the region where the engine load is relatively high in the self-ignition region RR explained with reference to FIG. 5, the pressure of the intake gas supplied to a combustion chamber 15 is relatively high. This is due to the opening degree of the throttle valve 46 being large and the supercharging pressure by the exhaust turbocharger 5 being relatively high. If the pressure of the intake gas supplied to the combustion chamber 15 is high in this way, the pressure of the intake gas in the combustion chamber 15 is relatively high. For this reason, the pre-mix formed in the cavity 91' self-ignites relatively easily. Under such circumstances, in the cavity 91', the air-fuel mixture self-ignites all at once.

FIG. 9 is a view showing the change in combustion in the cavity 91' when the engine load is relatively high. In the illustrated example as well, in the same way as the example shown in FIG. 8, ignition IG is performed by the spark plug 16 right after the ignition assist fuel is injected (FIG. 9(a)).

If ignition is performed by the spark plug 16, in the same way as the case shown in FIG. 8(b), the injection of ignition assist fuel causes flame propagation combustion SA of the pre-mix which had been formed around the spark plug 16 (FIG. 9(b)). In addition, when the engine load is relatively high, the pre-mix easily self-ignites. Therefore, right after flame propagation combustion SA around the spark plug 16, self-ignition combustion SI1 occurs in various regions in the cavity 91' (FIG. 9(b)) and, as shown by SI2, self-ignition combustion spreads all at once in the cavity 91' (FIG. 9(c)).

Therefore, when the engine load is relatively high, self-ignition combustion SI1 occurs right after flame propagation combustion SA. For this reason, as shown by the heat generation rate pattern B, the heat generation rate rises relatively rapidly from the initial period of rise. Further, when the engine load is relatively high, in the cavity 91', self-ignition combustion occurs simultaneously throughout the cavity 91'. For this reason, as shown by the heat generation rate pattern B, the heat generation rate rapidly rises and, accordingly, the peak value of the heat generation rate and the maximum rise speed of the heat generation rate are relatively large. Therefore, when the engine load is relatively high, the combustion noise is higher.

<<Position of Injection and Combustability>>

In this regard, when the fuel injector 31 injects fuel, the fuel will never disperse uniformly in the cavity 91'. Therefore, if the fuel injector 31 injects fuel, in the cavity 91', a region with a dense fuel concentration (region with a high equivalent ratio) and region with a thin one (region with low equivalent ratio) can be formed. Further, if fuel is sprayed from the fuel injector 31, fuel will vaporize in the cavity 91', but at the time of vaporization, steels the heat of vaporization, and therefore the ambient temperature is lowered. Therefore, the temperature of an air-fuel mixture with a high equivalent ratio in the cavity 91' is relatively low, while the temperature of an air-fuel mixture with a low equivalent ratio is relatively high.

In this regard, as explained above, the ease of self-ignition changes according to the temperature and pressure of the air-fuel mixture and the local equivalent ratio of the air-fuel mixture. As the temperature in the cavity 91' is higher, as the pressure in the cavity 91' is higher, and as the equivalent ratio of the air-fuel mixture is higher, self-ignition becomes easier. As a result, an air-fuel mixture with a high equivalent ratio and low temperature in the cavity 91' and an air-fuel mixture with low equivalent ratio and high temperature are the same extent in ease of self-ignition. Therefore, if not considering combustion by flame propagation caused by ignition, basically after the fuel injector 31 injects fuel, the ease of self-ignition is the same extent in the cavity 91' as a whole.

However, the side wall surface 93' defining the cavity 91' is lower in temperature compared with the air-fuel mixture in the cavity 91', and therefore near the side wall surface 93' of the cavity 91', heat is exchanged between the air-fuel mixture and the side wall surface 93'. As a result, near the side wall surface 93' of the cavity 91', the temperature of the air-fuel mixture becomes lower. As explained above, the ease of self-ignition changes depending on the temperature of the air-fuel mixture, and therefore near the side wall surface 93' of the cavity 91', self-ignition becomes harder.

Figure 11:
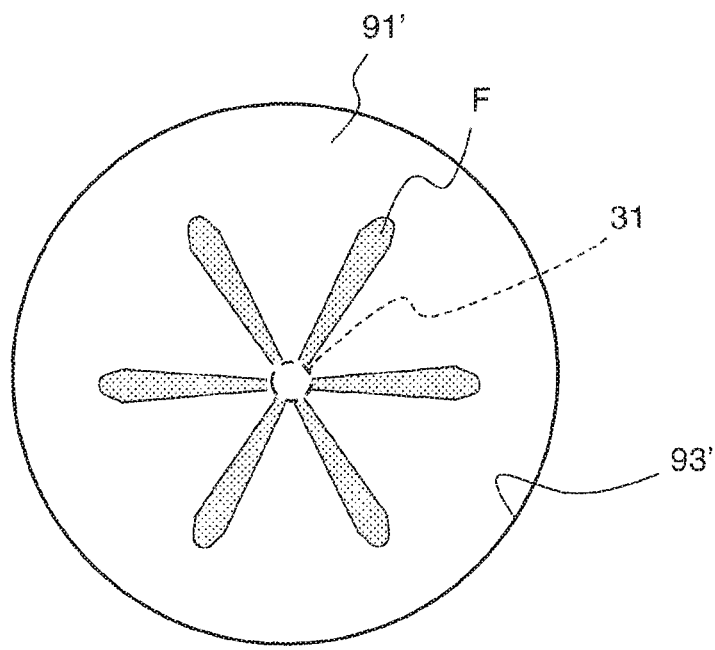
FIG. 11 is a view schematically showing a situation inside of a cavity in a state where fuel sprayed from a fuel injector only reaches locations far from a side wall surface of the cavity.

FIG. 11 shows the state where fuel F sprayed from the fuel injector 31 only reaches locations far from the side wall surface 93' of the cavity 91'. In such a state, the air-fuel mixture formed by the fuel F does not exchange heat with the side wall surface 93' of the cavity 91'. For this reason, the air-fuel mixture formed by the fuel F is substantially equal in ease of self-ignition over the entire region. Therefore, in the event where the engine load is relatively high, when the fuel F sprayed from the fuel injector 31 is in a state such as shown in FIG. 11, if self-ignition combustion occurs in the cavity 91', self-ignition occurs at the same time in the entire cavity 91' and the combustion noise is high. On the other hand, in the event where the engine load is relatively low, when the fuel F sprayed from the fuel injector 31 is in a state such as shown in FIG. 11, even if self-ignition combustion occurs in the cavity 91', as explained above, the self-ignition combustion occurs in stages and accordingly the combustion noise is kept low.

Figure 12:
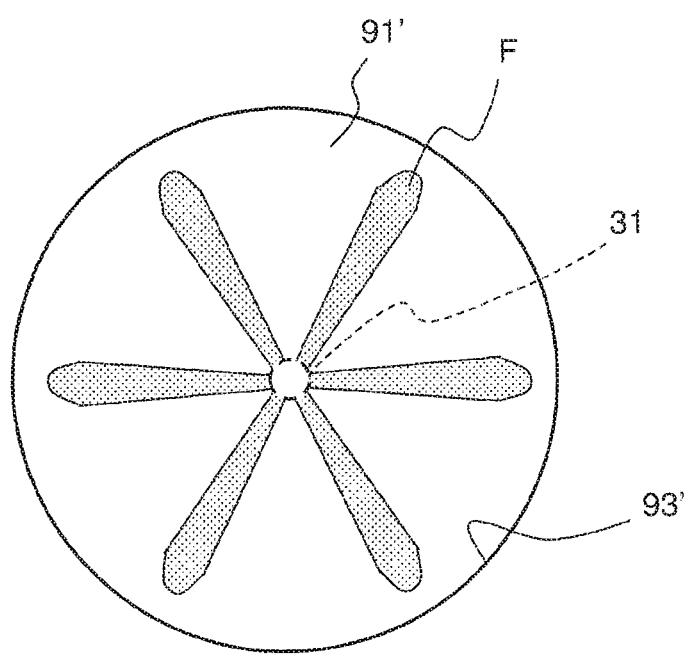
FIG. 12 is a view schematically showing a situation inside of a cavity in a state where fuel sprayed from a fuel injector reaches a vicinity of a side wall surface of the cavity.

FIG. 12 shows the state where the fuel F sprayed from the fuel injector 31 reaches near the side wall surface 93' of the cavity 91. In such a state, the air-fuel mixture formed by the fuel F exchanges heat with the side wall surface 93' in the region near the side wall surface 93'. Therefore, the air-fuel mixture formed by the fuel F easily self-ignites in the center region of the cavity 91' and is difficult in self-igniting in the peripheral regions. Therefore, even when the engine load is relatively high, when the fuel F sprayed from the fuel injector 31 is in the state such as shown in FIG. 12, when self-ignition combustion occurs in the cavity 91', first self-ignition combustion occurs at the center region, then self-ignition combustion occurs in the peripheral regions. That is, self-ignition combustion occurs in stages. Accordingly, the combustion noise can be kept low. On the other hand, when the engine load is relatively low, basically the inside of the cavity 91' is an atmosphere where self-ignition combustion is hard, and therefore at the peripheral regions in the cavity 91', the self-ignition timing of the air-fuel mixture is later and accordingly the combustion of the air-fuel mixture in the cavity 91' is too slow.

<<Control in Present Embodiment>>

In this regard, in the present embodiment, the directions in which fuel sprayed from the fuel injector 31 heads, are changed in accordance with the engine load so as to change the distances from the side wall surface 93 of the cavity 91. Below, referring to FIGS. 13 and 14, the change of the spray directions of fuel in accordance with the engine load in the present embodiment will be explained.

Figure 13:
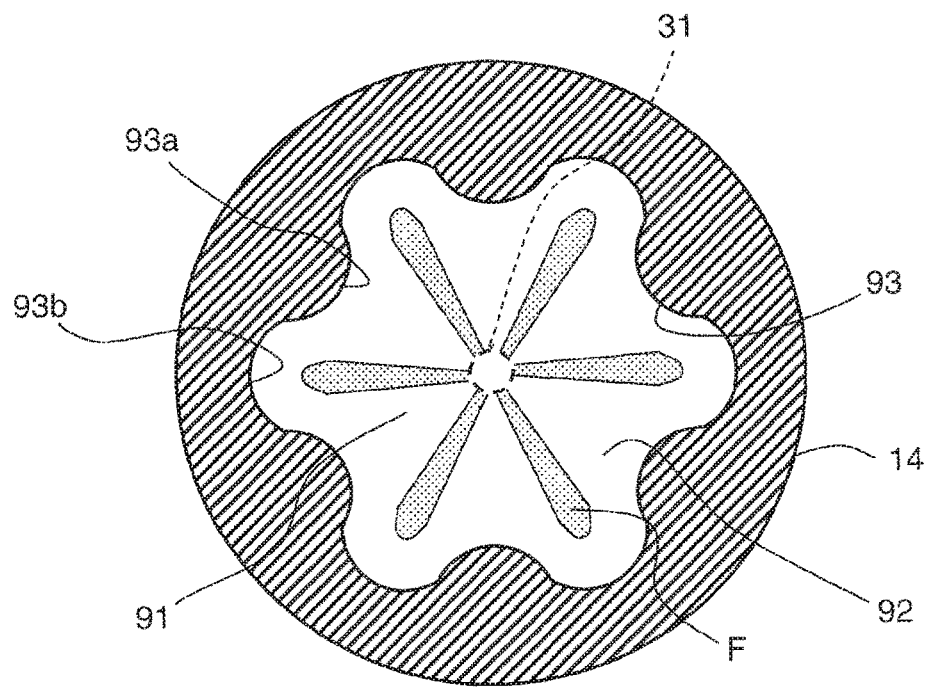
FIG. 13 is a view schematically showing traveling directions of fuel in a cavity in the case where an engine load is relatively low.

FIG. 13 is a view schematically showing the traveling directions of fuel in the cavity 91 in the case where the engine load is relatively low. As shown in FIG. 13, in the present embodiment, the number of spray holes from which fuel is sprayed from the fuel injector 31 is six, which is equal to the number of the inside projecting parts 93a and the number of the outside recessed parts 93b of the cavity 91. Further, the spray holes of the fuel injector 31 are arranged at equal intervals in the circumferential direction of the cylinder 11, so as to match the intervals of the inside projecting parts 93a and the intervals of the outside recessed parts 93b. In addition, the spray directions from the spray holes of the fuel injector 31 are directions toward outside recessed parts 93b.

In the case shown in FIG. 13 where the engine load is relatively low, the swirl control valve 95 is fully opened so that the swirl flow generated in the combustion chamber 15 is weak. Due to this, almost no swirl flow is generated in the combustion chamber 15 and, accordingly, almost no swirl flow is generated in the cavity 91 either. Therefore, in this case, the fuel sprayed from all spray holes of the fuel injector 31, as shown in FIG. 13, travels straight toward the outside recessed parts 93b of the cavity 91, that is, parts of the side wall surface 93 with relatively long distances from the fuel injector 31.

In this regard, the outside recessed parts 93b of the cavity 91 are relatively long in distances from the fuel injector 31, and therefore when the air-fuel mixture starts to burn by self-ignition, the fuel F sprayed from the fuel injector 31 only reaches locations far from the side wall surface 93 of the cavity 91. For this reason, the air-fuel mixture formed by the fuel F is substantially equal in ease of self-ignition over the entire region. Therefore, the self-ignition timing of the air-fuel mixture no longer is retarded at the peripheral regions in the cavity 91 and accordingly the burning of the air-fuel mixture in the cavity 91 is kept from becoming too slow. Further, since the engine load is relatively low, the combustion noise is also kept low.

Figure 14:
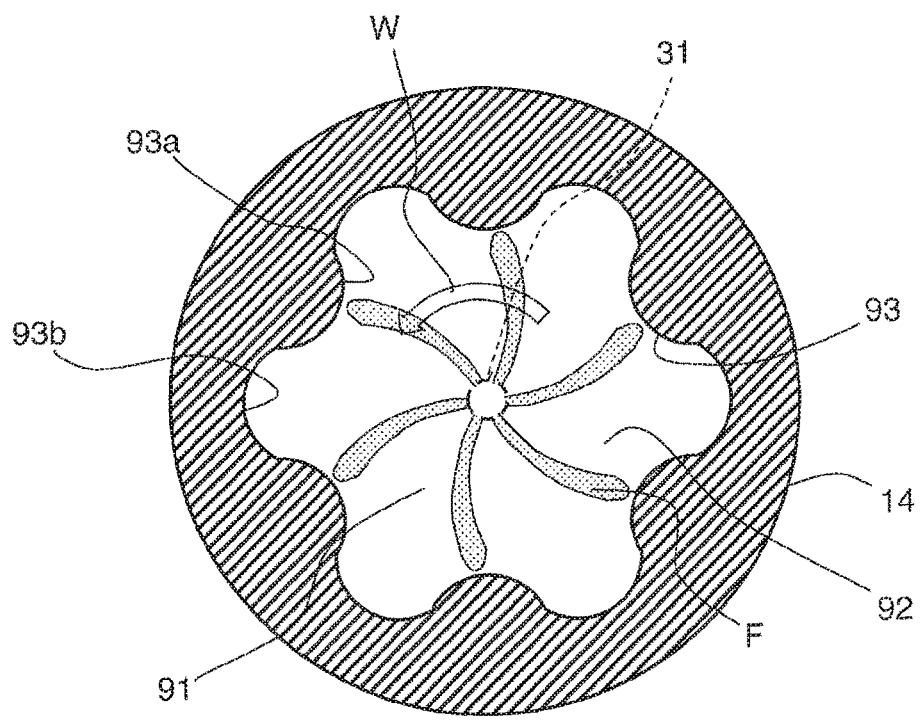
FIG. 14 is a view schematically showing traveling directions of fuel in a cavity in the case where an engine load is relatively high.

On the other hand, FIG. 14 is a view schematically showing traveling directions of fuel in a cavity 91 in the case where the engine load is relatively high. In the case shown in FIG. 14 where the engine load is relatively high, the swirl control valve 95 is fully closed so that the swirl flow generated in the combustion chamber 15 is strong. Due to this, a strong swirl flow is generated in the combustion chamber 15 and accordingly a strong swirl flow is generated in the cavity 91 as shown by W in FIG. 14. Therefore, in this case, the fuel sprayed from the spray holes of the fuel injector 31, as shown in FIG. 14, travels in directions offset in the swirl direction of the swirl flow, as the fuel approaches closer to the side wall surface 93. As a result, the fuel sprayed from spray holes of the fuel injector 31 travels toward the inside projecting parts 93a of the cavity 91, that is, parts of the side wall surface 93 relatively short in distances from the fuel injector 31.

In this regard, since the inside projecting parts 93a of the cavity 91 are relatively short in distances from the fuel injector 31, when the air-fuel mixture starts to burn by self-ignition, the fuel F sprayed from the fuel injector 31 reaches close to the side wall surface 93 of the cavity 91. For this reason, the air-fuel mixture formed by the fuel F easily self-ignites in the center region of the cavity 91 and is hard to self-ignite in the peripheral regions. As a result, self-ignition combustion occurs in stages and therefore the combustion noise can be kept low.

In this way, in the present embodiment, when the engine load is relatively low, the swirl control valve 95 is fully opened so that the swirl flow is relatively weak so as to keep fuel sprayed from the fuel injector 31 from moving in the circumferential direction. Due to this, the combustion of the air-fuel mixture in the cavity 91 is kept from becoming too slow. On the other hand, when the engine load is relatively high, the swirl control valve 95 is fully closed so that the swirl flow is relatively strong so as to promote movement of the fuel sprayed from the fuel injector 31 in the circumferential direction. Due to this, even when the engine load is relatively high, the combustion noise can be kept low. As a result, in the present embodiment, when the engine load is relatively low, it is possible to keep the combustion of the air-fuel mixture from becoming too slow, while when the engine load is relatively high, it is possible to keep the combustion noise low.

Note that, the number of spray holes from which fuel is sprayed from the fuel injector 31 does not necessarily have to be respectively equal to the number of the inside projecting parts 93a and the number of the outside recessed parts 93b of the cavity 91. Therefore, the number of spray holes may be smaller than number of the inside projecting parts 93a or the outside recessed parts 93b. In this case, the spray holes of the fuel injector 31 are arranged so that fuel is sprayed only toward part of the outside recessed parts 93b among the plurality of outside recessed parts 93b.

<<Explanation of Flow Chart>>

Figure 15:
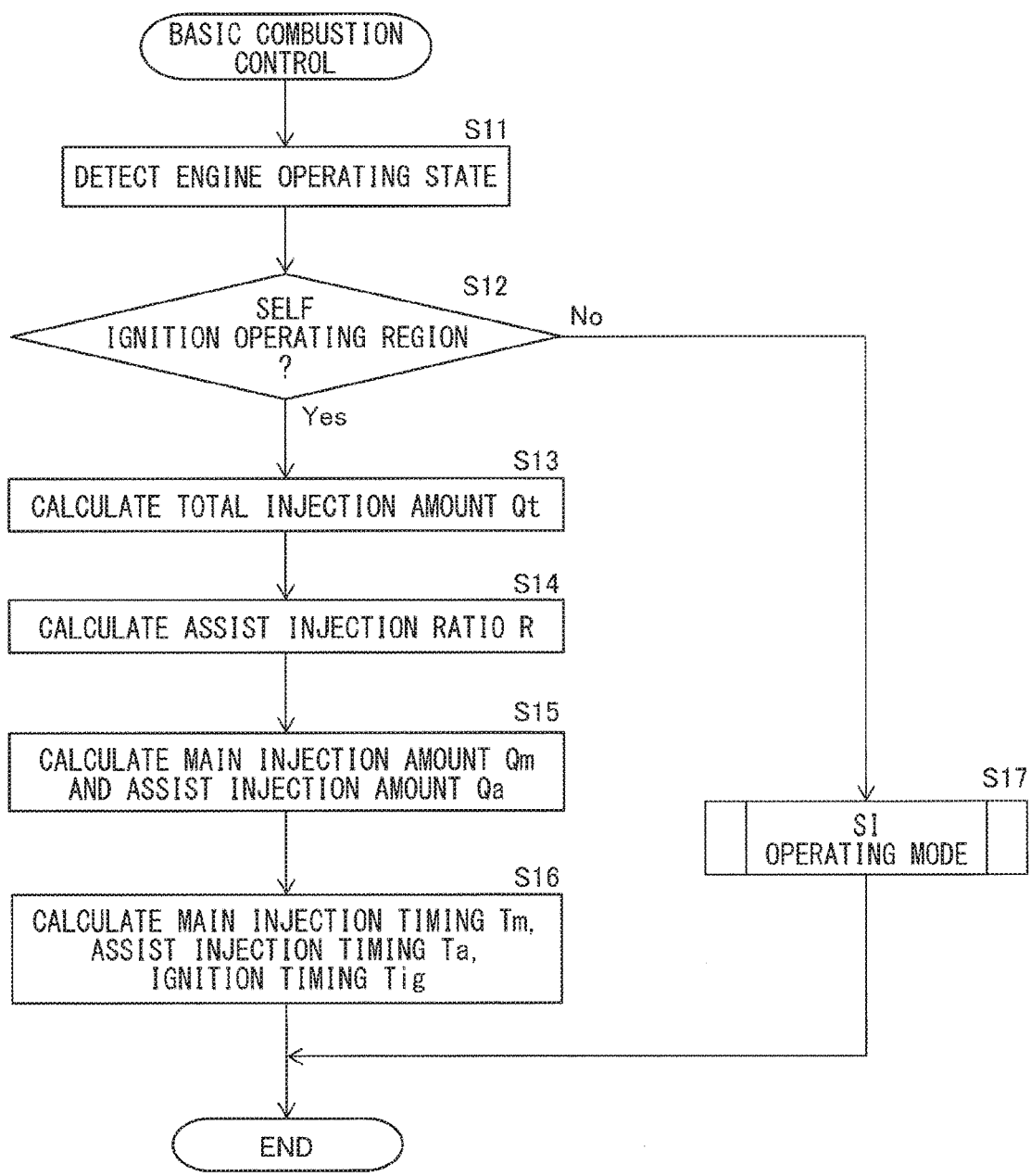
FIG. 15 is a flow chart showing a control routine for basic combustion control.

FIG. 15 is a flow chart showing a control routine for basic combustion control. The illustrated control routine is repeatedly executed every certain time interval (for example, 4 ms).

Referring to FIG. 15, first, at step S11, the engine load detected by the load sensor 88 and the engine rotational speed calculated based on the crank angle sensor 89 are used to detect the engine operating state. Next, at step S12, it is judged if the current engine operating state detected at step S11 is in the self-ignition region RR. When at step S12 it is judged that the current engine operating state is in the self-ignition region RR, the routine proceeds to step S13.

At step S13, the total fuel injection amount Qt is calculated based on the engine load detected by the load sensor 88, etc. The total fuel injection amount Qt is, for example, obtained by storing a map determining the relationship between the engine load and total fuel injection amount in the ROM 74 of the ECU 71, and calculating it based on the engine load using this map. The total fuel injection amount Qt is set so as to become greater as the engine load becomes larger.

Next, at step S14, the ratio R of the injection amount Qa of the ignition assist fuel to the total fuel injection amount Qt is calculated. The ratio R is, for example, set to become larger as the engine load becomes smaller. This is so as to make the amount of injection of ignition assist fuel increase so that compression self-ignition combustion becomes easier to occur when the engine load has become smaller, since the smaller the engine load, the more the amount of intake air decreases, and thus the more the temperature and pressure of the pre-mix fall, and as a result the harder compression self-ignition combustion becomes.

Next, at step S15, the injection amount Qm of the main fuel and the injection amount Qa of the ignition assist fuel are calculated based on the total fuel injection amount Qt calculated at step S13 and the ignition assist injection ratio R calculated at step S14. Next, at step S16, the injection timing Tm of the main fuel, the injection timing Ta of the ignition assist fuel, and the ignition timing Tig by the spark plug 16 are calculated, using a predetermined map, etc., stored in the ROM 74 of the ECU 71, based on the engine load and the engine rotational speed, and the control routine is ended. The injection timing of the main fuel, the injection timing of the ignition assist and ignition timing fuel are, for example, set so as to be advanced more as the engine rotational speed becomes faster.

On the other hand, when at step S12 it is judged that the current engine operating state is not in the self-ignition region RR, the routine proceeds to step S17. At step S17, the fuel injector 31, spark plug 16, etc., are controlled so that combustion is performed in a combustion chamber 15 in the SI operating mode.

Figure 16:
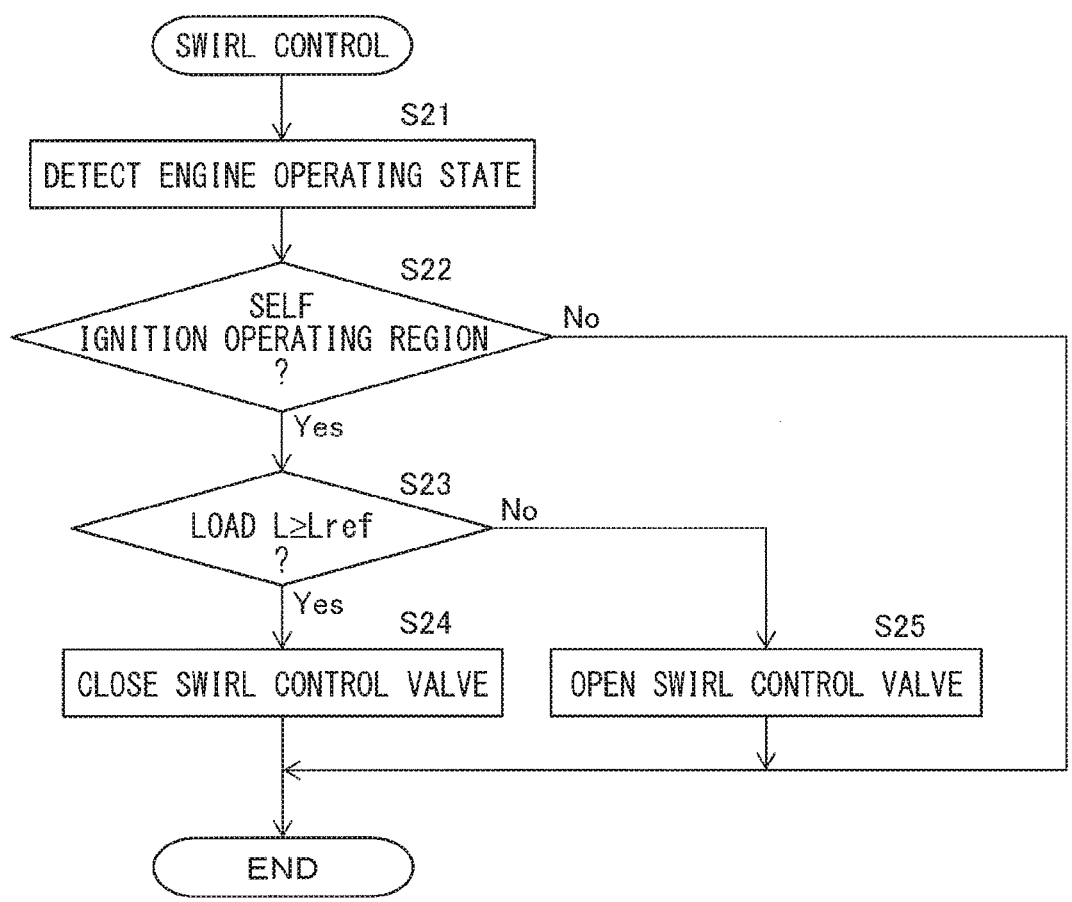
FIG. 16 is a flow chart showing a control routine for opening and closing control of a swirl control valve.

FIG. 16 is a flow chart showing a control routine for opening and closing control of a swirl control valve. The illustrated control routine is repeatedly executed every certain time interval (for example, 4 ms).

Referring to FIG. 16, first, at step S21, in the same way as step S11 of FIG. 15, the engine operating state is detected. Next, at step S22, it is judged if the engine operating state detected at step S21 is in the self-ignition region RR. When at step S22 it is judged that the engine operating state is in the self-ignition region RR, the routine proceeds to step S23.

At step S23, it is judged if the engine load L detected by the load sensor 88 is a predetermined reference load Lref or more. In this regard, the reference load Lref, as shown in FIG. 5, is a load in the self-ignition region RR and is set to not more than the upper limit value of the load so that even if fuel from the fuel injector 31 travels straight toward outside recessed parts 92b, combustion noise will become a predetermined value or less.

When at step S23 it is judged that the engine load L is the reference load Lref or more, the routine proceeds to step S24. At step S24, the swirl control valve 95 is fully closed so that a strong swirl flow is generated in the combustion chamber 15, and the control routine is ended. On the other hand, when at step S23 it is judged that the engine load L is less than the reference load Lref, the routine proceeds to step S25. At step S25, the swirl control valve 95 is fully opened so that almost no swirl flow is generated in the combustion chamber 15, and the control routine is ended.

<Second Embodiment>

Next, referring to FIGS. 17 to 19, an internal combustion engine according to a second embodiment will be explained. The configuration and control of an internal combustion engine according to the second embodiment are basically similar to the configuration and control of internal combustion engine according to the first embodiment. Therefore, below, mainly the parts different from the internal combustion engine according to the first embodiment will be explained.

Figure 17:
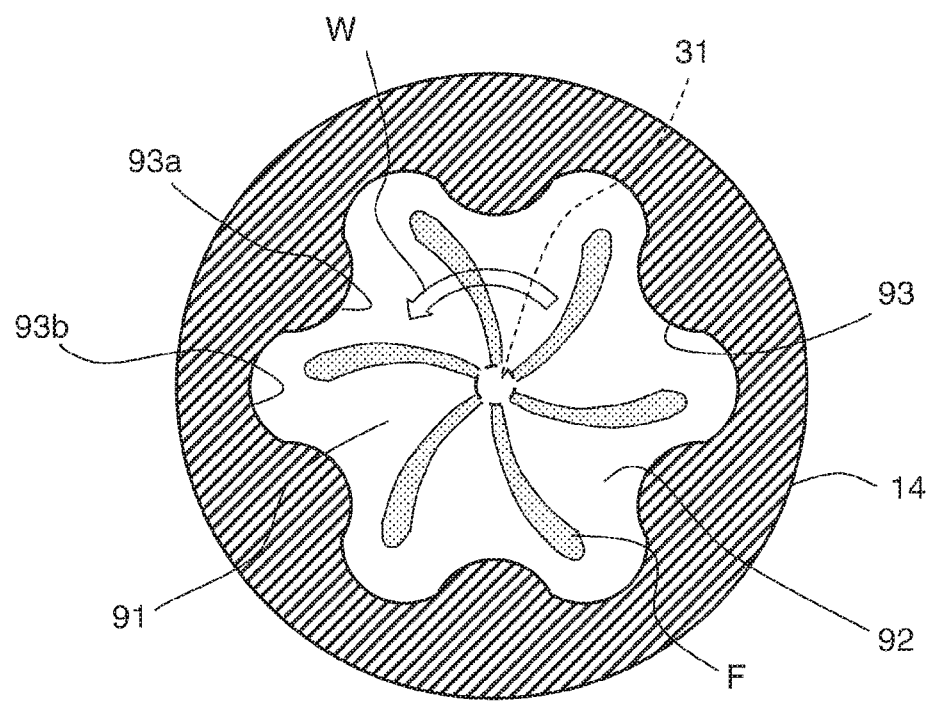
FIG. 17 is a view schematically showing traveling directions of fuel in a cavity in the case where an engine load is relatively low.

FIG. 17 is a view schematically showing traveling directions of fuel in the cavity 91 in the case where the engine load is relatively low. As shown in FIG. 17, in the present embodiment as well, the number of spray holes from which fuel is sprayed from the fuel injector 31 is six, which is equal to the number of the inside projecting part 93a and the number of the outside recessed part 93b of the cavity 91, respectively. Further, the spray directions of spray holes of the fuel injector 31 are directions toward inside projecting parts 93a.

In the case shown in FIG. 17 where the engine load is low, the swirl control valve 95 is fully closed so that the swirl flow generated in a combustion chamber 15 is strong. Due to this, a strong swirl flow is generated in the combustion chamber 15 and accordingly a strong swirl flow is generated in the cavity 91 as shown by W in FIG. 17. Therefore, in this case, the fuel sprayed from spray holes of the fuel injector 31, as shown in FIG. 17, travel in directions offset in the swirl direction of the swirl flow, as the fuel approaches closer to the side wall surface 93. As a result, the fuel sprayed from the spray holes of the fuel injector 31 travels toward outside recessed parts 93b of the cavity 91, that is, parts of the side wall surface 93 with relatively long distances from the fuel injector 31.

As a result, when the engine load is low, the fuel F sprayed from the fuel injector 31 only reaches locations far from the side wall surface 93 of the cavity 91 at the self-ignition timing of the air-fuel mixture. For this reason, the air-fuel mixture formed by the fuel F is substantially equal in ease of self-ignition throughout the entire region and burning of the air-fuel ratio in the cavity 91 is kept from becoming too slow. Further, since the engine load is low, the combustion noise is also kept low.

Figure 18:
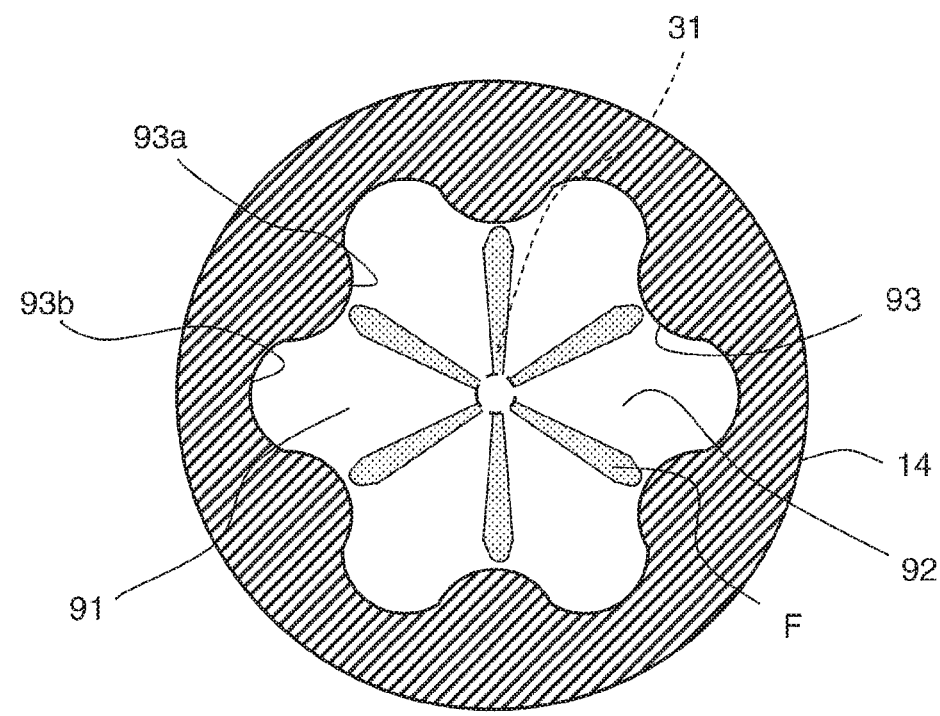
FIG. 18 is a view schematically showing traveling directions of fuel in a cavity in the case where an engine load is relatively high.

On the other hand, FIG. 18 is a view schematically showing traveling directions of fuel in a cavity 91 when the engine load is relatively high. In the case shown in FIG. 18 where the engine load is relatively high, the swirl control valve 95 is fully opened so that the swirl flow generated in the combustion chamber 15 is weak. Due to this, in the combustion chamber 15, almost no swirl flow is generated and accordingly almost no swirl flow is generated in the cavity 91 as well. Therefore, in this case, the fuel sprayed from spray holes of the fuel injector 31, as shown in FIG. 18, travels straight toward the inside projecting parts 93a of the cavity 91, that is, toward parts of the side wall surface 93 of relatively short distances from the fuel injector 31.

As a result, if the engine load is high, the fuel F sprayed from the fuel injector 31 reaches the vicinity of the side wall surface 93 of the cavity 91 at the self-ignition timing of the air-fuel mixture. For this reason, the air-fuel mixture formed by the fuel F is easy to self-ignite at the center region of the cavity 91 and is hard to self-ignite at the peripheral regions. As a result, self-ignition combustion occurs in stages and accordingly the combustion noise can be kept low.

In this way, in the present embodiment, when the engine load is relatively low, the swirl control valve 95 is fully closed so the swirl flow is relatively strong so as to promote movement of the fuel sprayed from the fuel injector 31 in the circumferential direction. Due to this, combustion of the air-fuel mixture in the cavity 91 is kept from becoming too slow. On the other hand, when the engine load is relatively high, the swirl control valve 95 is fully opened so that the swirl flow is relatively weak so as to keep the fuel sprayed from the fuel injector 31 from moving in the circumferential direction. Due to this, even when the engine load is relatively high, the combustion noise can be kept low. As a result, even in the present embodiment, when the engine load is relatively low, the combustion of the air-fuel mixture can be kept from becoming too slow while when the engine load is relatively high, the combustion noise can be kept low.

Figure 19:
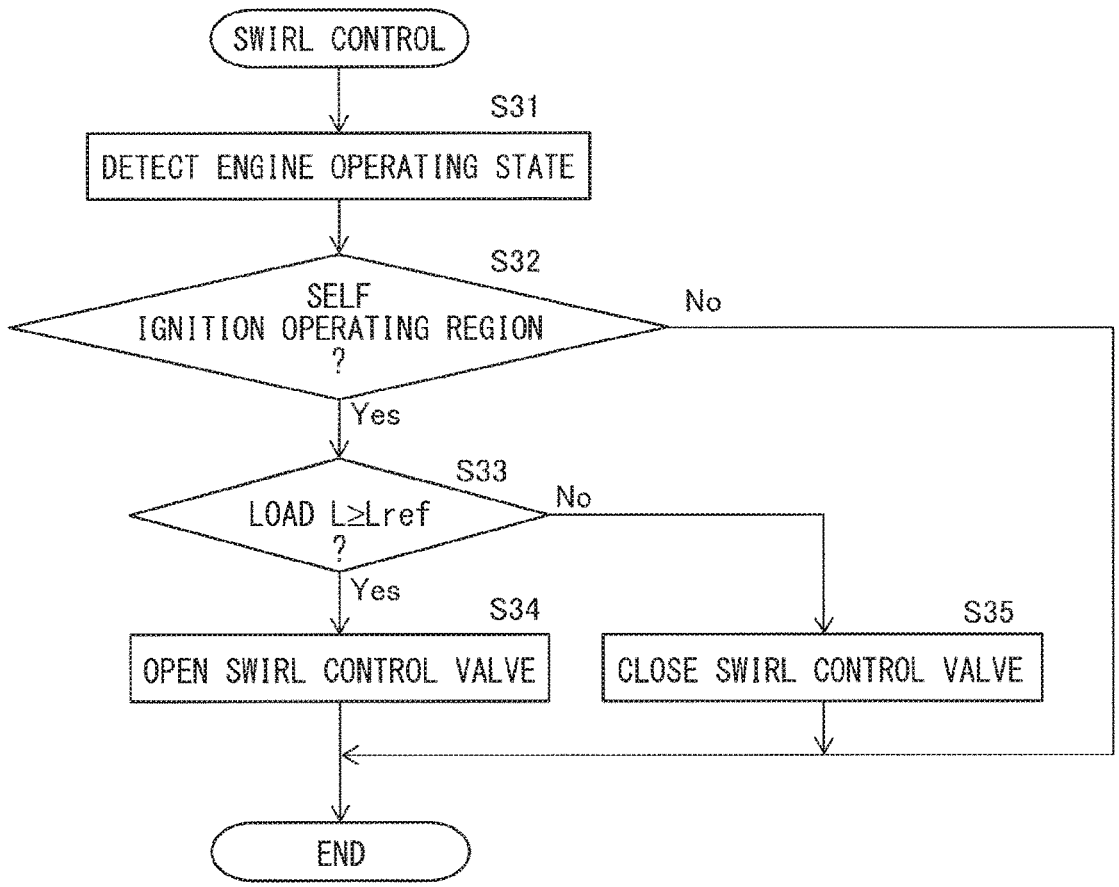
FIG. 19 is a flow chart showing a control routine for opening and closing control of a swirl control valve.

FIG. 19 is a flow chart showing a control routine for opening and closing control of a swirl control valve. The illustrated control routine is repeatedly performed at every certain time interval (for example, 4 ms). Steps S31 to S33 of FIG. 19 are similar to steps S21 to S23 of FIG. 16, and therefore explanations will be omitted.

When at step S33 it is judged that the engine load L is the reference load Lref or more, the routine proceeds to step S34. At step S34, the swirl control valve 95 is fully opened so that almost no swirl flow is generated in the combustion chamber 15 and the control routine is ended. On the other hand, when at step S33 it is judged that the engine load L is less than the reference load Lref, the routine proceeds to step S35. At step S35, the swirl control valve 95 is fully closed so that a strong swirl flow is generated in the combustion chamber 15 and the control routine is ended.

<Third Embodiment>

Next, referring to FIG. 20, an internal combustion engine according to a third embodiment will be explained. The configuration and control of an internal combustion engine according to the third embodiment are basically similar to the configuration and control of internal combustion engines according to the first embodiment and the second embodiment. Therefore, below, mainly the parts different from the internal combustion engines according to the first embodiment and the second embodiment, will be explained.

In the above-mentioned first embodiment and second embodiment, the swirl control valve 95 is switched between the fully opened and fully closed state based on whether the engine load is a reference load or more. As opposed to this, in the present embodiment, the opening degree of the swirl control valve 95 is changed in accordance with the engine load.

In the present embodiment, in the same way as the first embodiment, spray directions from spray holes of the fuel injector 31 are directions toward outside recessed parts 93b. Further, the swirl control valve 95, etc., are configured so that when the swirl control valve 95 is fully opened, almost no swirl flow is generated and accordingly fuel sprayed from spray holes of the fuel injector 31 travels straight toward outside recessed parts 93b of the cavity 91. In addition, the swirl control valve 95, etc., are configured so that when the swirl control valve 95 is fully closed, a strong swirl flow is generated and fuel sprayed from spray holes of the fuel injector 31 travels toward inside projecting parts 93a of the cavity 91.

Figure 20:
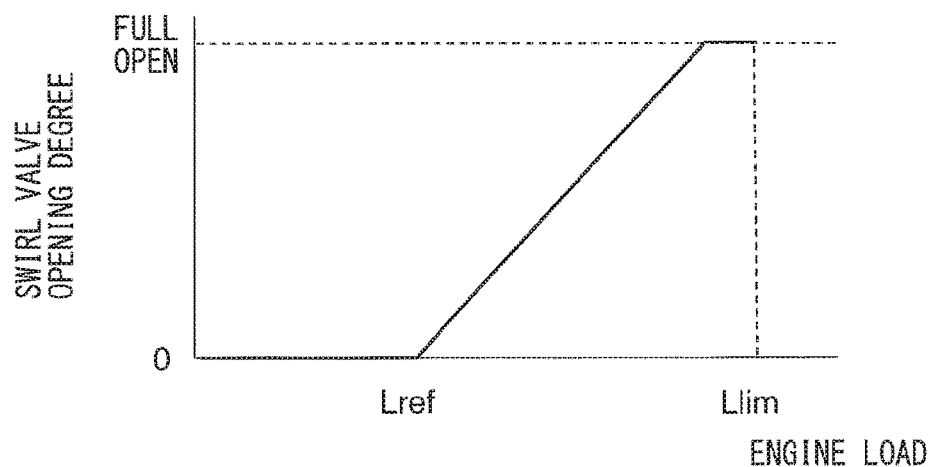
FIG. 20 is a view showing a relationship between an engine load and an opening degree of a swirl control valve.

FIG. 20 is a view showing a relationship between the engine load and the opening degree of the swirl control valve 95. As shown in FIG. 20, when the engine load is less than the reference load Lref, the opening degree of the swirl control valve 95 is zero. If the engine load is the reference load Lref or more, the opening degree of the swirl control valve 95 is increased along with the rise of the engine load. In addition, in the present embodiment, the swirl control valve 95 is fully opened before the engine load reaches the maximum load Llim of the self-ignition region RR (changes according to the engine rotational speed).

In this way, in the present embodiment, the more the engine load increases, the more the opening degree of the swirl control valve 95 is increased. As a result, as the engine load increases, the fuel sprayed from the fuel injector 31 heads toward the parts of the side wall surface 93 of the cavity 91 shorter in distances from the fuel injector. In other words, in the present embodiment, the swirl control valve 95 is controlled so that as the engine load increases, the fuel sprayed from the fuel injector 31 heads toward the parts of the side wall surface 93 of the cavity 91 shorter in distances from the fuel injector. Due to this, it is possible to more suitably keep the combustion from becoming too slow and suppress an increase in the combustion noise.

Note that, in the present embodiment, in the same way as the first embodiment, the spray directions from spray holes of the fuel injector 31 are directions toward outside recessed parts 93b. However, the spray directions from spray holes of the fuel injector 31 may also be directions toward inside projecting parts 93a. In this case, control is performed so that the more the engine load increases, the more the opening degree of the swirl control valve 95 decreases.

Summarizing the above, in the first embodiment to the third embodiment, the control system 70 controls the swirl control device during the ignition assist control so that when the engine load is relatively high, compared to when the engine load is relatively low, the fuel sprayed from the fuel injector 31 heads toward parts of the side wall surface 93 of the cavity 91 which are relatively short in distances from the fuel injector 31.

REFERENCE SIGNS LIST 1. internal combustion engine
10. engine body
15. combustion chamber
16. spark plug
31. fuel injector
71. electronic control unit (ECU)
95. swirl control valve

The invention claimed is:

1. An internal combustion engine comprising:
 a fuel injector arranged at a top surface of a cylinder; a spark plug configured to ignite an air-fuel mixture in a combustion chamber; a piston having a cavity in its top surface;
 a swirl control device configured to control a strength of a swirl flow formed in said combustion chamber; and
 a control system configured to control said fuel injector, said spark plug, and said swirl control device,
 wherein
 said fuel injector is positioned in said cavity when viewed in an axial direction of said cylinder;
 said cavity includes a side wall surface, the side wall surface being spaced apart from said fuel injector by different distances in a circumferential direction;
 said control system being configured to perform ignition assist control, the ignition assist control including successively performing an injection of a main fuel from said fuel injector and an injection of an ignition assist fuel, controlling injection amounts and injection timings of said main fuel and said ignition assist fuel and an ignition timing of said spark plug so as to make an air-fuel mixture formed by the injection of said ignition assist fuel burn by flame propagation and make a remaining fuel burn by pre-mix compression self-ignition using heat generated by said combustion by flame propagation; and
 said control system is configured to control said swirl control device during said ignition assist control so that when an engine load is relatively high, compared to when the engine load is relatively low, the fuel sprayed from said fuel injector heads toward first parts of said side wall surface of said cavity which are relatively closer to said fuel injector than other parts of said side wall surface of said cavity.

2. The internal combustion engine according to claim 1, wherein said cavity includes inside projecting parts formed as the first parts, the inside projecting parts having relatively short distances from said fuel injector to said side wall surface and outside recessed parts having relatively long distances from said fuel injector to said side wall surface, the inside projecting parts and the outside recessed parts being alternately arranged in the circumferential direction, and at least two each of said inside projecting parts and said outside recessed parts are provided.

3. The internal combustion engine according to claim 2, wherein
 said fuel injector includes spray holes which are formed so that spray directions from the spray holes are directions toward said outside recessed parts,
 said control system is configured to control said swirl control device so that when an engine load is lower than a predetermined load, the swirl flow is relatively weak so as to suppress movement of fuel sprayed from said fuel injector in the circumferential direction, and
 said control system is configured to control said swirl control device so that when an engine load is at said predetermined load or more, the swirl flow is relatively strong so as to promote movement of the fuel sprayed from said fuel injector in the circumferential direction.

4. The internal combustion engine according to claim 2, wherein
 said fuel injector includes spray holes which are formed so that the spray directions from the spray holes are directions toward said inside projecting parts, said control system is configured to control said swirl control device so that when an engine load is lower than a predetermined load, the swirl flow is relatively strong so as to promote movement of the fuel sprayed from said fuel injector in the circumferential direction, and said control system is configured to control said swirl control device so that when an engine load is at said predetermined load or more, the swirl flow is relatively weak so as to suppress movement of the fuel sprayed from said fuel injector in the circumferential direction.

5. The internal combustion engine according to claim 2, wherein said fuel injector includes a number of spray holes equal to the number of said inside projecting parts of said cavity, and the spray holes of said fuel injector and said inside projecting parts are arranged at equal intervals in the circumferential direction of the cylinder.

6. The internal combustion engine according to claim 3, wherein said fuel injector includes a number of spray holes equal to the number of said inside projecting parts of said cavity, and the spray holes of said fuel injector and said inside projecting parts are arranged at equal intervals in the circumferential direction of the cylinder.

7. The internal combustion engine according to claim 4, wherein said fuel injector includes a number of spray holes equal to the number of said inside projecting parts of said cavity, and the spray holes of said fuel injector and said inside projecting parts are arranged at equal intervals in the circumferential direction of the cylinder.

\* \* \* \* \*